(12) United States Patent
Leiberman et al.

(10) Patent No.: US 10,681,408 B2
(45) Date of Patent: *Jun. 9, 2020

(54) SYSTEMS AND METHODS FOR CREATING COMPOSITE VIDEOS

(71) Applicants: David Leiberman, Brooklyn, NY (US); Samuel Rubin, Croton-on-Hudson, NY (US)

(72) Inventors: David Leiberman, Brooklyn, NY (US); Samuel Rubin, Croton-on-Hudson, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/482,265

(22) Filed: Apr. 7, 2017

(65) Prior Publication Data
US 2017/0236551 A1    Aug. 17, 2017

Related U.S. Application Data

(63) Continuation-in-part of application No. 14/708,805, filed on May 11, 2015, now Pat. No. 9,691,429.

(51) Int. Cl.
| | |
|---|---|
| *H04N 21/439* | (2011.01) |
| *H04N 9/82* | (2006.01) |
| *G11B 27/34* | (2006.01) |
| *H04N 21/8547* | (2011.01) |
| *H04N 21/43* | (2011.01) |

(Continued)

(52) U.S. Cl.
CPC ....... *H04N 21/4394* (2013.01); *G11B 27/031* (2013.01); *G11B 27/10* (2013.01); *G11B 27/28* (2013.01); *G11B 27/34* (2013.01); *H04N 5/76* (2013.01); *H04N 9/8211* (2013.01); *H04N 21/4307* (2013.01); *H04N 21/47205* (2013.01); *H04N 21/8547* (2013.01)

(58) Field of Classification Search
CPC ..... G11B 27/036; G11B 27/34; G11B 27/031; G11B 27/10; G11B 27/28; H04N 9/8211; H04N 21/8547; H04N 21/4307; H04N 21/47205; H04N 21/4394
USPC ........................................................ 386/285
See application file for complete search history.

(56) References Cited

U.S. PATENT DOCUMENTS

| | | |
|---|---|---|
| 5,265,248 A | 11/1993 | Moulios et al. |
| 7,026,536 B2 | 4/2006 | Lu et al. |

(Continued)

OTHER PUBLICATIONS

Musicstory: A personalized Music Video Creator; David A. Shamma, Bryan Paredo, Kristian J. Hammond; Proceedings of the 13th Annual ACEM International Conference on Multimedia; ACM, 2005.

(Continued)

*Primary Examiner* — Loi H Tran
(74) *Attorney, Agent, or Firm* — Robert W. Morris; Eckert Seamans Cherin & Mellott, LLC

(57) ABSTRACT

Systems and methods for creating videos played on an audio track are provided. In some embodiments, a master take may be selected after one or more video takes are captured. The video portions of the takes may then be played on top of the audio track of the master take. The takes may be analyzed to determine notable events occurring within each take. The video takes may be played on top of the audio track of the chosen master take so that they all appear integrated into a single scene. Clips from the video takes may be paired or matched with certain sections of the audio track based on, for example, the notable events.

18 Claims, 22 Drawing Sheets

(51) Int. Cl.
  *H04N 21/472* (2011.01)
  *G11B 27/28* (2006.01)
  *G11B 27/10* (2006.01)
  *G11B 27/031* (2006.01)
  *H04N 5/76* (2006.01)

(56) References Cited

U.S. PATENT DOCUMENTS

| | | | |
|---|---|---|---|
| 7,027,124 | B2 | 4/2006 | Foote et al. |
| 7,301,092 | B1 | 11/2007 | McNally et al. |
| 7,500,176 | B2 | 3/2009 | Thomson et al. |
| 8,046,688 | B2 | 10/2011 | Adams et al. |
| 8,244,103 | B1* | 8/2012 | Shore ............... G11B 27/34 386/278 |
| 8,271,872 | B2 | 9/2012 | Salvucci |
| 8,704,069 | B2 | 4/2014 | Naik et al. |
| 8,896,609 | B2 | 11/2014 | Xu et al. |
| 2002/0035475 | A1 | 3/2002 | Yoda |
| 2003/0025726 | A1* | 2/2003 | Yamamoto ......... G11B 27/036 715/723 |
| 2004/0060070 | A1 | 3/2004 | Mizushima |
| 2005/0143915 | A1 | 6/2005 | Odagawa |
| 2005/0190199 | A1 | 9/2005 | Brown et al. |
| 2006/0288849 | A1 | 12/2006 | Peeters |
| 2008/0037953 | A1 | 2/2008 | Kawamura |
| 2008/0055469 | A1 | 3/2008 | Miyasaka |
| 2009/0164034 | A1 | 6/2009 | Cohen et al. |
| 2010/0002137 | A1* | 1/2010 | McKinney ......... G06F 17/30796 348/563 |
| 2010/0290538 | A1 | 11/2010 | Xu et al. |
| 2012/0201518 | A1* | 8/2012 | Singer ............... G06F 17/30058 386/279 |
| 2012/0316660 | A1 | 12/2012 | Luo et al. |
| 2013/0300900 | A1* | 11/2013 | Pfister ............... G06K 9/00315 348/239 |
| 2013/0330062 | A1 | 12/2013 | Meikle et al. |
| 2014/0160250 | A1 | 6/2014 | Pomerantz |
| 2014/0317480 | A1 | 10/2014 | Chau et al. |
| 2014/0320697 | A1 | 10/2014 | Lammers et al. |
| 2015/0050009 | A1 | 2/2015 | Svendsen |
| 2016/0051819 | A1* | 2/2016 | Koka ................... A61N 1/0541 607/57 |
| 2018/0061455 | A1* | 3/2018 | Singer ................ H04N 9/802 |
| 2018/0330756 | A1* | 11/2018 | MacDonald ......... G11B 27/036 |

OTHER PUBLICATIONS

Creating Music Videos Using Automatic Media Analysis; Jonathan Foote, Matthew Cooper, and Andreas Girgensohn; Proceedsings of the 10th International Conference on Multimedia; ACM, 2002.
MuViSync: Realtime Music Video Alignment; R. Macrae, X. Anguera, N. Oliver; 2010 IEEE International Conference on Multimedia and Expo (ICME), 534-9, 2010; ISBN-13: 978-1-4244-7491-2; DOI: 10.1109/ICME.2010.5583863; Conference: 2010 IEEE International Conference on Multimedia and Expo (ICME), Jul. 19-23, 2010, Suntec City, Singapore; Publisher: IEEE, Piscataway, NJ, US.
Cati Dance: Self-Edited, Self-Synchronized Music Video; Tristan Jehan, Michael Lew, and Cati Vaucelle; ACM SIGGRAPH 2003 Sketches & Applications. ACM, 2003.
Dubsmash by Mobile Motion GmbH; https://itunes.apple.com/app/dubsmash/id918820076 retrieved on May 11, 2015.
Video Star by Frontier Design Group; https://itunes.apple.com/us/app/video-star/id438596432?mt=8 retrieved on May 11, 2015.
Ekin, et al—Automatic Soccer Video . . . Department of Electrical and Computer Engineering—University of Rochester, New York.

\* cited by examiner

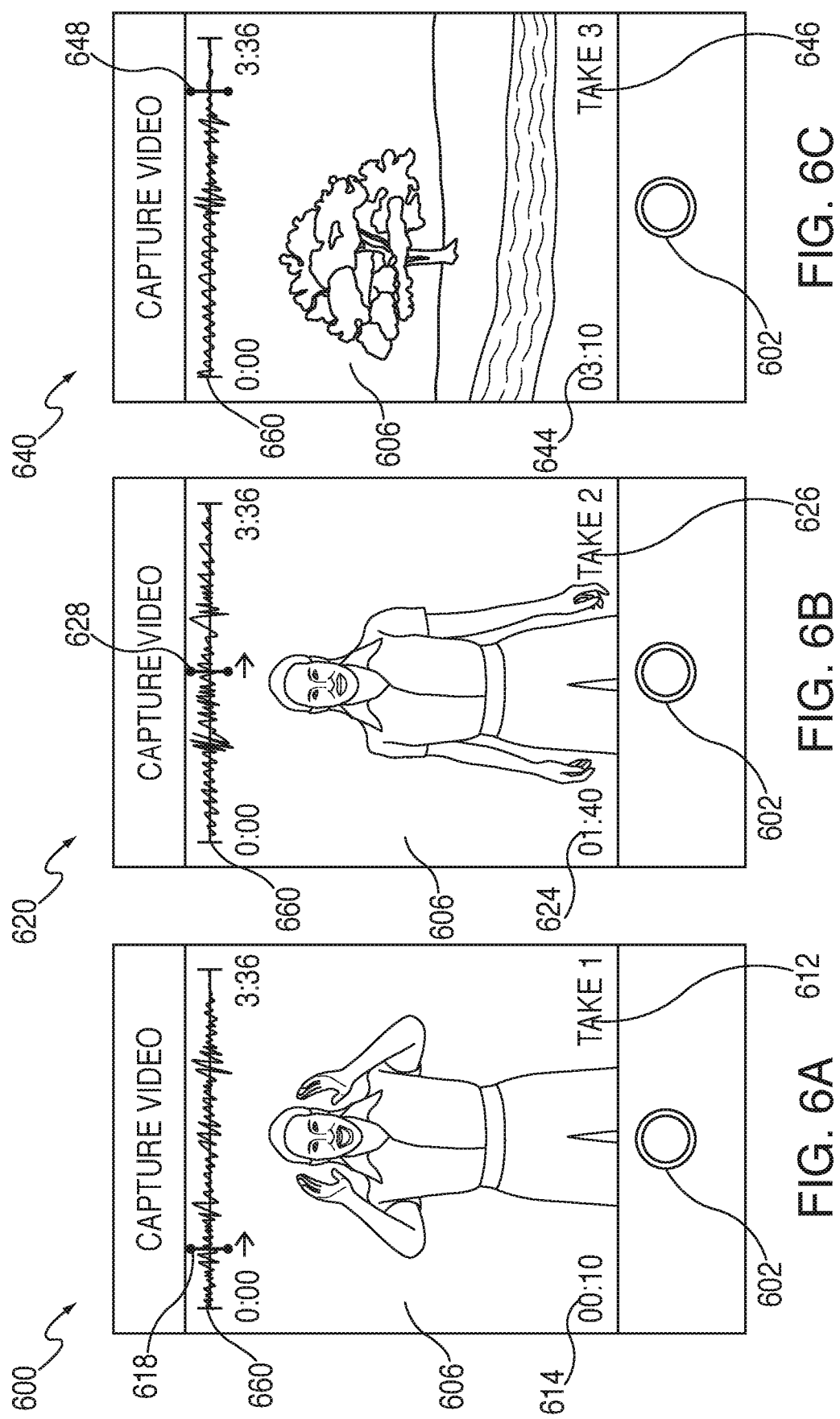

SYSTEMS AND METHODS FOR CREATING COMPOSITE VIDEOS

STATEMENT OF RELATED APPLICATIONS

This application is a continuation-in-part of U.S. patent application Ser. No. 14/708,805, filed on May 11, 2015, which is hereby incorporated in its entirety by this reference.

FIELD OF THE INVENTION

Various embodiments described herein generally relate to systems and methods for creating music videos. In particular, music videos may be created including portions of one or more video takes that are automatically synchronized to an audio track.

BACKGROUND OF THE INVENTION

Music videos, whether they involve famous musicians or independent artists, are fun and creative mediums for sharing one's music and musical style with the world. While most music videos, at least historically, were created in support of established musicians for marketing purposes, the enhanced capabilities of mobile devices allows almost any individual to record and edit music, as well as capture video, all using one device. Individuals, whether an experienced musician or a novice, young or old, now have the ability to create their own music videos using such devices.

Although music videos often include an individual's own music, it is also possible for music videos to be created based on an individual's favorite or a popular song. While there are presently some applications of this concept, most of these applications have several inherent drawbacks.

In one instance, music videos have been created where an audio track plays in the background while a single video is captured or recorded. This, however, creates an extremely poor quality music video as there is no visual transition between various parts of the audio track. For example, a single video take may be used for the audio track's verse and chorus. This leads to extremely unprofessional looking music videos that, while potentially entertaining, are aesthetically inferior to professional quality music videos, which may use multiple video takes captured at one or more locations.

Another instance of music videos being created focuses on a linear application of a video and audio track. For example, a single video take may be captured and multiple end points may be applied to that video. However, this application is extremely limited in that it does not allow a user to use multiple video, and, as such, does not allow the user to apply multiple end points to the multiple videos. Furthermore, in order to have different locations in the music video, a user would need to visit multiple locations in chronological order and capture video at each location. The editing of the video takes captured at each location would then only present the locations in the order that they were visited. This, as mentioned previously, creates a music video that is unprofessional in appearance, as professional music videos may have varying locations throughout the music video.

In another, somewhat similar, instance, music videos have been created where a user is required to capture video of another individual within a silhouette. A generic silhouette is overlaid on the user's display and, while the user records video, the individual being recorded must stay generally within the bounds of the silhouette. While this may expand the manipulative aspects of the video, the user is unfortunately constrained to be within one particular area, and does not have a free range of motion to fully capture any desired action. Furthermore, as the user is bound by the silhouette, the ability to transition to different video takes for different portions of an audio track is limited, if at all possible.

In yet another instance, music videos have been created that include only a small portion or snippet of the audio track with an individual capturing a single video for that portion of the audio track. For example, a user may select a song to form a music video for, and create a music video based on the song's verse or chorus. This may lead to short, dull, and unprofessional music videos as the music video may become nothing more than a video clip for a small tidbit of a song.

Thus, in light of some of the aforementioned problems, it would be beneficial for there to be systems, methods, and non-transitory computer readable mediums that allow a user to create a professional style music video using portions of multiple videos takes taken at different times and at different locations that are automatically synchronized to a selected audio track. Furthermore, it would be beneficial for there to be systems, methods, and non-transitory computer readable medium that allow video takes to be paired with an audio track such that sections of the audio track having various intensity levels or dynamics are matched with suitable portions of the video takes.

SUMMARY OF THE INVENTION

This generally relates to systems, methods, and non-transitory computer readable mediums for creating videos that are synchronized to an audio track.

In one exemplary embodiment, a method for creating a music video where an audio track is synchronized with multiple video takes is described. An audio track, such as a song, may be selected. For example, a user may select a song stored on their user device, in a music library on an external device, or on a music server. Multiple video takes may be captured also using the user device. While the multiple video takes are being captured, they may also be synchronized with the selected audio track. The synchronization allows for the captured video takes to be aesthetically and/or musically synchronized with an appropriate section or sections of the audio track. A music video may then be created including the audio track and at least a subset of the plurality of video takes that are already synchronized to the selected audio tracks. For example, portions of one or more captured video takes may be matched to certain sections of the audio track based on the audio track's audio intensity levels and/or a particular video take's video intensity.

In another exemplary embodiment, a user device including at least one audio input component, at least image capturing component, memory, and at least one processor is described. The memory may store an audio track recorded using the at least one audio input component and multiple video takes captured by the at least one image capturing component. For example, a user may record an audio track using their user device's microphone as well as record video takes using one or more cameras resident on the user device. The at least one processor of the user device may then determine a vocal and/or melodic phrase within the recorded audio track, and synchronize at least a portion of one or more captured video takes to the recorded audio track based on the determined vocal and/or melodic phrase while the at least one of the plurality of video takes is captured.

In yet another exemplary embodiment, another method for creating a music video is described. An audio track may be selected and multiple video takes may be captured. A number of faces within each video take of the captured video takes may be determined while the plurality of video takes are being captured. Also while the plurality of video takes are being captured, at least a subset of the plurality of captured video takes may be synchronized to the selected audio track based on the number of faces determined to be within each video take. A music video may then be created including the selected audio track and at least the subset of the plurality of captured video takes synchronized to the selected audio track.

In still yet another exemplary embodiment, a user device including memory for storing multiple video takes, at least one image capturing component, and at least one processor is described. The at least one processor is operable to receive a selection of an audio track from the plurality of audio tracks stored in memory. The audio track may then play and, while playing, at least one video take may be captured using the at least one image capturing component. The at least one captured video take may be synchronized to the selected audio track while the selected audio track plays. A music video may then be generated that includes the selected audio track and at least a subset of the at least one video take that is already synchronized to the selected audio track.

In another embodiment, systems, methods, and devices for creating composite videos are provided. The methods include capturing multiple takes. Each take of the takes includes an audio track and a video track. A master take is selected from the multiple captured takes, and the master take includes a master video track and a master audio track. The method then involves partitioning at least one video track of a captured take into video clips; and replacing a portion of the master video track with at least one of the video clips.

BRIEF DESCRIPTION OF THE DRAWINGS

The above and other features of the present invention, its nature and various advantages will be more apparent upon consideration of the following detailed description, taken in conjunction with the accompanying drawings in which:

FIGS. 6A-C are illustrative diagrams of various user interfaces displaying video takes being captured by a user device for a music video in accordance with various embodiments;

DETAILED DESCRIPTION OF THE INVENTION

The present invention may take form in various components and arrangements of components, and in various techniques, methods, or procedures and arrangements of steps. The referenced drawings are only for the purpose of illustrated embodiments, and are not to be construed as limiting the present invention. Various inventive features are described below that can each be used independently of one another or in combination with other features. Furthermore, in at least some embodiments, like referenced numerals refer to like parts throughout.

Figure 1:
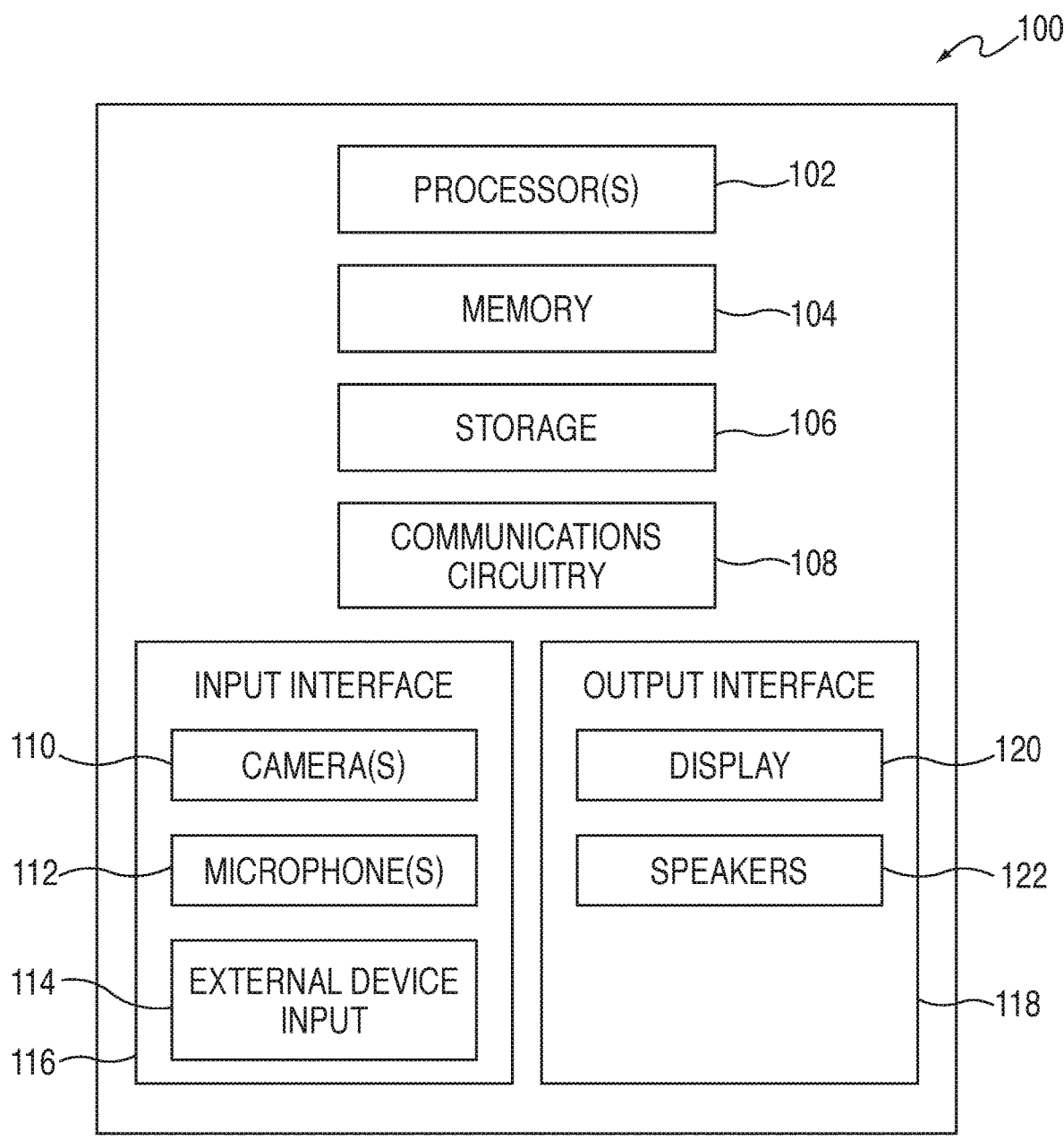
FIG. 1 is an illustrative block diagram of a user device in accordance with various embodiments.

FIG. 1 is an illustrative block diagram of a user device in accordance with various embodiments. User device 100, in some embodiments, may correspond to any electronic device or system. Various types of user devices include, but are not limited to, portable media players, cellular telephones or smart phones, pocket-sized personal computers, personal digital assistants ("PDAs"), desktop computers, laptop computers, tablet computers, and/or electronic accessory devices such as smart watches and bracelets. User device 100 may communicate with one or more additional user devices, networks, and/or servers. For example, user device 100 may send text messages to other user devices across a network, or user device 100 may access one or more websites located on a server.

User device 100, in some embodiments, may include one or more processors 102, memory 104, storage 106, communications circuitry 108, an input interface 110, and an output interface 118. In some embodiments, input interface 110 may include one or more cameras 110 or other image capturing components, one or more microphones 112 or other audio capturing components, and one or more external device inputs 116. Further, in some embodiments, output interface 118 may include display 120 and one or more speakers 122 or other audio output components. Persons of ordinary skill in the art will recognize that user device 100 may include any number of components, and one or more additional components or modules may be added or omitted without deviating from the scope of the present disclosure. Additionally, one or more components may be combined or separated, and multiple instances of various components are also possible, however only one of each component is shown within user device 100 for simplicity.

Processor(s) 102 may include any suitable processing circuitry, such as one or more processors, capable of controlling the operations and functionality of user device 100. In some embodiments, processor(s) 102 may facilitate communications between various components within user device 100. For example, processor(s) 102 may cause output interface 118 to perform an associated output in response to one or more inputs being detected by input interface 110. Processor(s) 102 may run an operating system for user device 100, applications resident on user device 100, firmware applications, media application, and/or any other type of application, or any combination thereof function on, or in conjunction with, user device 100.

Memory 104 may include any suitable form of memory, such as cache memory, semi-permanent memory (e.g., RAM), or any other memory type, or any combination of. In some embodiments, memory 104 may be used in place of and/or in addition to an external memory or storage unit or device for storing data on user device 100.

Storage 106 may include one or more storage mediums. Various types of storage mediums include, but are not limited to, hard drives, solid state drives, flash memory, permanent memory (e.g., ROM), or any other storage type, or any combination thereof. Any form of data or content may be stored within storage 106, such as photographs, music files, videos, contact information, applications, documents, or any other file type, or any combination thereof.

In some embodiments, memory 104 and storage 106 may be combined into a single component. For example, a single memory component may include memory and storage functions. In other embodiments, multiple instances of memory 104 and/or storage 106 may be present, however it is also possible for memory 104 and/or storage 106 to be external to user device 100. For example, one or more files may be stored remotely on an external hard drive or on a cloud storage provider. However, persons of ordinary skill in the art will recognize that the aforementioned scenarios are merely examples.

Communications circuitry 108 may include any circuitry capable of connecting user device 100 to one or more additional devices (e.g., laptop computers, smartphones, etc.), one or more networks (e.g., local area networks ("LAN"), wide area networks ("WAN"), point-to-point networks, etc.), and/or one or more servers (e.g., file management systems, music directories, etc.). Communications circuitry may support any suitable communications protocol including, but not limited to, Wi-Fi (e.g., 802.11 protocol), Bluetooth®, radio frequency systems (e.g., 900 MHz, 1.4 GHz, and 5.6 GHz communications systems), infrared, GSM, GSM plus EDGE, CDMA, quadband, VOIP, or any other communications protocol, or any combination thereof.

Input interface 110 may include any suitable mechanism and/or component for receiving inputs from a user operating user device 100. For example, input interface 110, in one embodiment, includes one or more cameras 112. Cameras 112 may correspond to any suitable image capturing component capable of capturing images and/or video. For example, camera 112 may capture photographs, sequences of photographs, rapid shots, videos, or any other type of image, or any combination thereof. In some embodiments, cameras 112 may be capable of capturing high-definition ("HD"), 3-D, and/or panoramic images and/or videos. In some embodiments, cameras 112 may include one or more filters or settings for images and/or video that may be captured by cameras 112 (e.g., black and white, monochromatic, fades, slow-motion, etc.). In some embodiments, user device 100 may include multiple instances of camera 112. For example, user device 100 may include a front-facing camera and a rear-facing camera. In some embodiments, one or more additional image capturing components, such as a zoom or add on filter, may be used in connection with, or instead of, camera 112 to aid in capturing images and/or videos.

Microphone(s) 114 may be any component capable of detecting and/or receiving audio signals. For example, microphone(s) 114 may include one or more sensors for generating electrical signals and circuitry capable of processing the generated electrical signals. In some embodiments, user device 100 may include multiple instances of microphone 114, such as a first microphone and a second microphone. In some embodiments, user device 100 may include multiple microphones capable of detecting various frequency levels (e.g., high/low-frequency microphones). Furthermore, in some embodiments, one or more external microphones may be connected to user device 100 and may be used in conjunction with, or instead of, microphone(s) 114.

External device input 116 may correspond to any input interface or set of input interfaces capable of receiving inputs from an external device. For example, one or more external microphones, as described above, may be coupled to user device 100 through external device input 116. As another example, a user may couple an electric guitar, drums, and/or keyboard to user device 100 via external device input 116. However, it is also possible for a user to couple one or more external devices, such as a guitar or keyboard, to an external musical interface (e.g., a mixing board or computer), which in turn may couple to user device 100 via external device input 116.

Output interface 118 may include any suitable mechanism or component for generating outputs from a user operating user device 100. For example, display 120 may, in some embodiments, present content to a user on user device 100. Display 120 may be any size or shape, and may be located on one or more regions/sides of user device 100. For example, display 120 may fully occupy a first side of user device 100, or display 120 may only occupy a portion of a first side of user device 100. Various display types include, but are not limited to, liquid crystal displays ("LCD"), monochrome displays, color graphics adapter ("CGA") displays, enhanced graphics adapter ("EGA") displays, variable graphics array ("VGA") displays, 3-D displays, high-definition ("HD") displays, or any other display type, or any combination thereof.

In some embodiments, display 120 may be a touch screen and/or an interactive touch sensitive display screen. For example, display 120 may be a multi-touch panel coupled to processor(s) 102, and may include one or more capacitive sensing panels. In some embodiments, display 120 may also correspond to a component, or portion, of input interface 110, as it may recognize and one or more touch inputs. For example, in response to detecting certain touch inputs on display 120, processor(s) 102 may execute one or more functions for user device 100 and/or may display certain content on display 120.

Speakers 122 may correspond to any suitable mechanism for outputting audio signals. For example, speakers 122 may include one or more speaker units, transducers, or arrays of speakers and/or transducers capable of broadcasting audio signals and/or audio content to an area where user device 100, or a user, may be located. In some embodiments, speakers 122 may correspond to headphones or ear buds capable of broadcasting audio directly to a user. In yet another embodiment, one or more external speakers may be connected to user device 100 (e.g., via external device input 116), and may serve to provide audio content to a user associated with user device 100.

Figure 2:
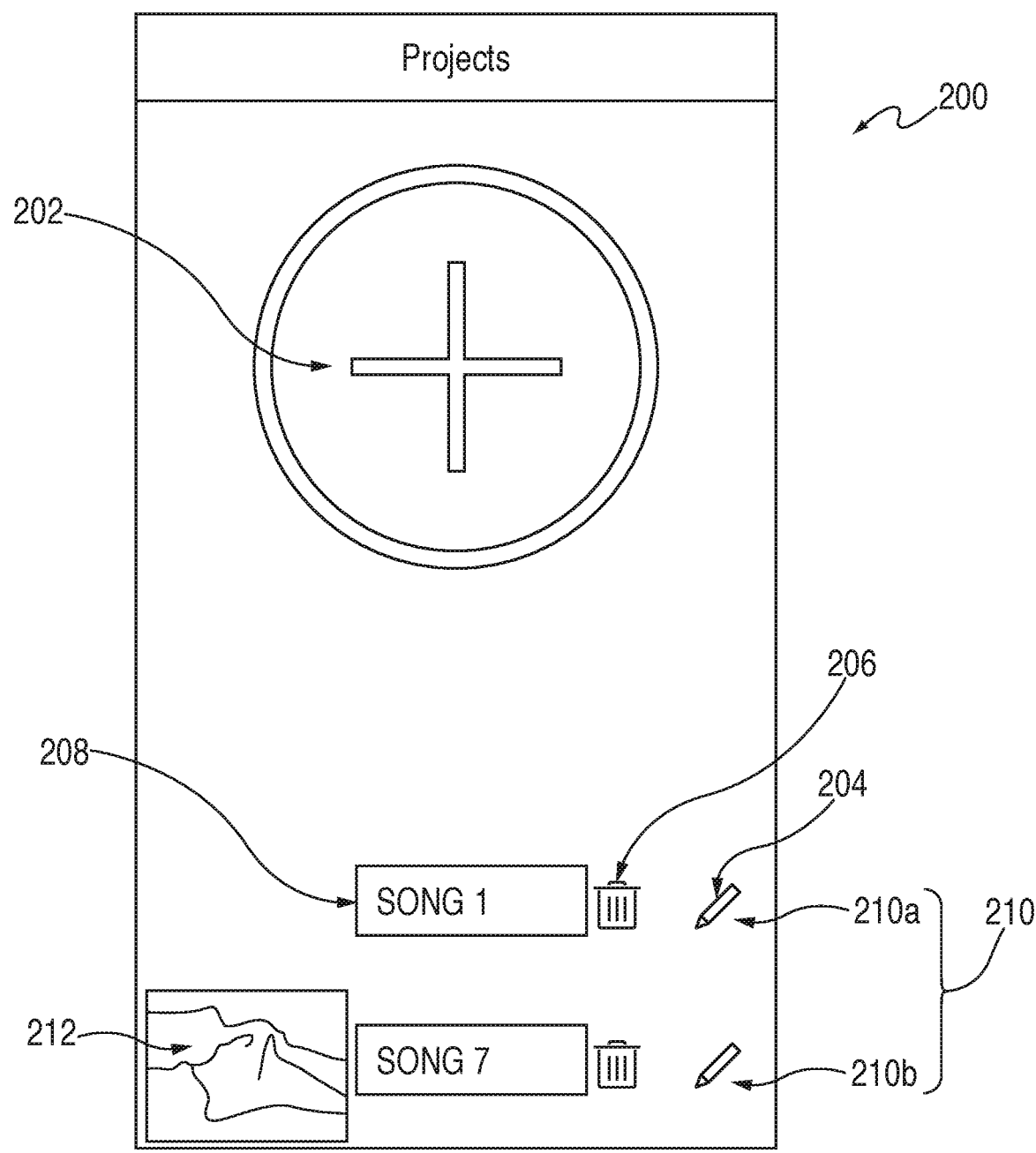
FIG. 2 is an illustrative diagram of a user interface displayed on a user device in accordance with various embodiments.

FIG. 2 is an illustrative diagram of a user interface displayed on a user device in accordance with various embodiments. User interface 200, in some embodiments, is displayed on a display screen, such as display 120 of user device 100. User interface 200 may include project button 202. A user may select project button 202, in some embodiments, to begin a process of making a music video (described in more detail below).

In some embodiments, user interface 200 may include project section 210 including already formed or started projects 210a and 210b. Each of projects 210a and 210b include a song title 208, for which the corresponding project's music video is based on. For example, a user may have previously created a music video based on a song entitled "Song 1". Each project 210a and 210b may also include a delete button 206 and an edit button 204. When a user selects edit button 204 for a particular project, the user may be taken into that project's workspace, and may have the option to edit the project in one or more ways, which will be described in greater detail below. A user may also choose to delete a certain project or projects by selecting delete button 206. For example, a user may be unsatisfied with a particular music video they created in one of projects 210a and 210b, and may choose to delete that project. User interface 200 may also include preview window 212 for each project 210a, 210b. Preview window may present a clip or sample of the created music video from each of projects 210a and 210b so that a user may see, prior to editing or deleting a particular project, what the music video will look like. This way, a user may be able to familiarize themselves with the music video for a specific project to determine whether or not further edits are needed and/or the music video should be deleted.

Figure 3A:
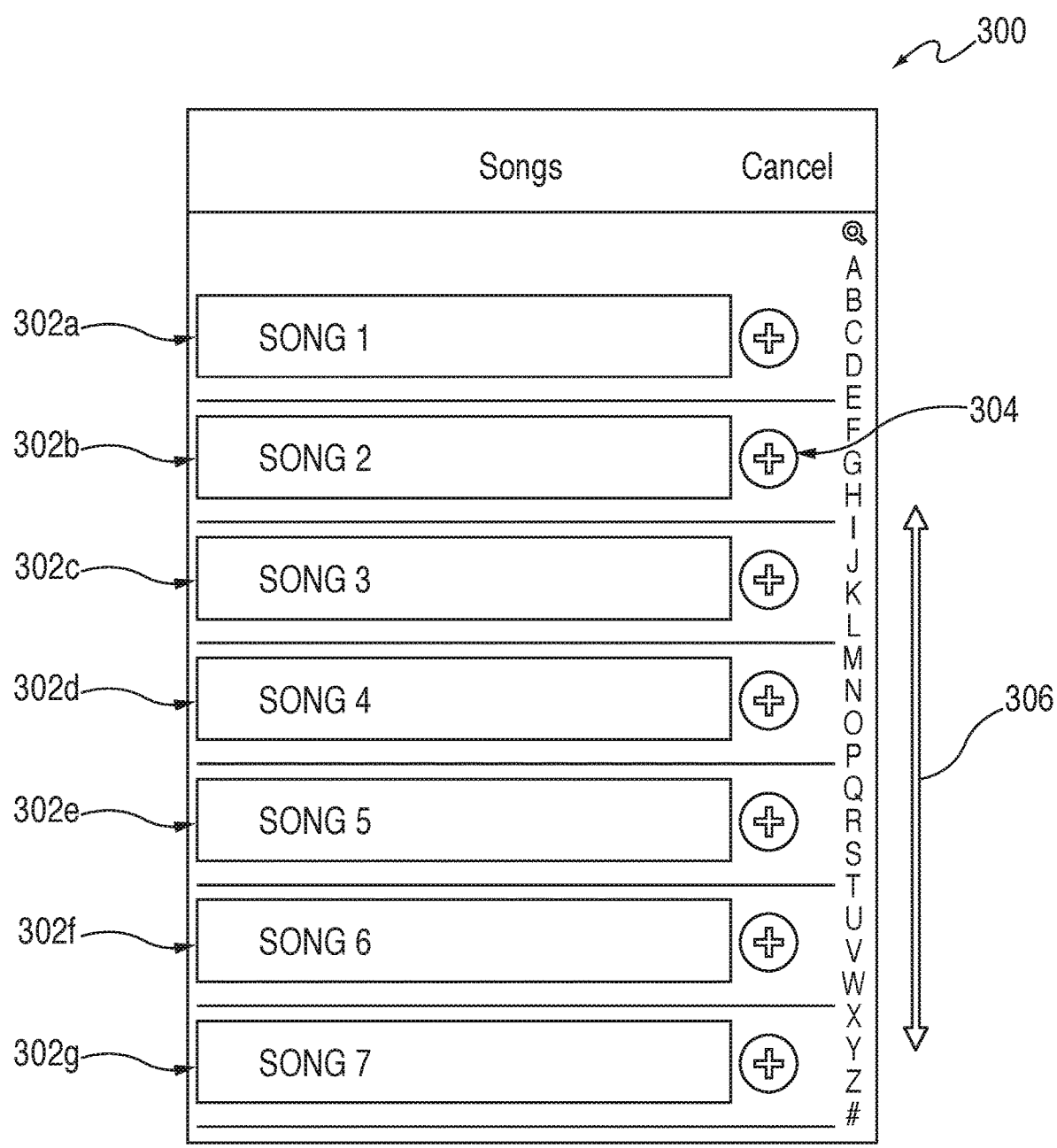
FIGS. 3A and 3B are illustrative diagrams of user interfaces displayed on a user device for selecting an audio track in accordance with various embodiments.
Figure 3B:
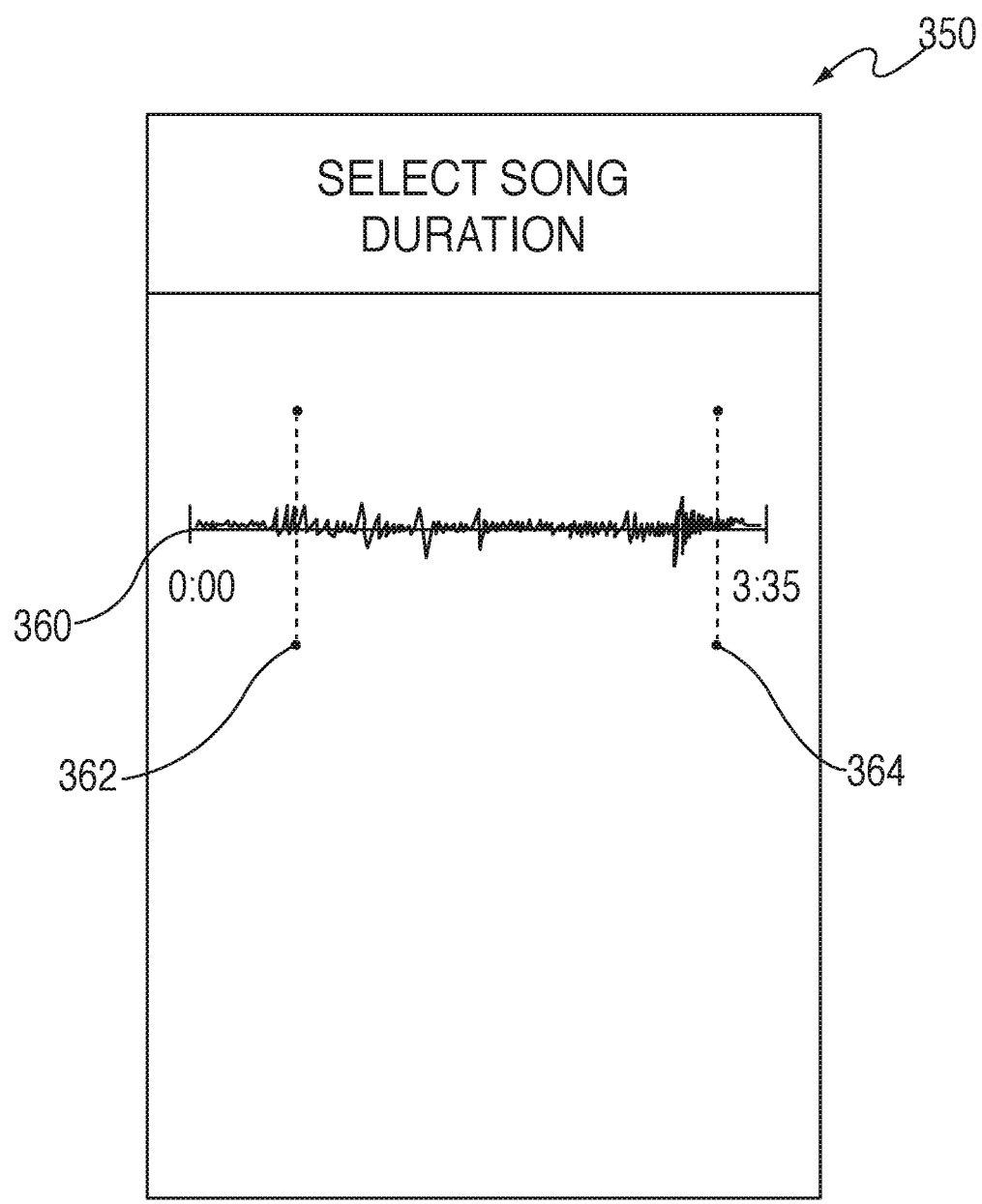

FIGS. 3A and 3B are illustrative diagrams of user interfaces displayed on a user device for selecting an audio track in accordance with various embodiments. User interface 300 of FIG. 3A includes audio tracks 302a-g displayed therein, which are presented in response to a user selecting project button 202 on user interface 200. Audio tracks 302a-g, in some embodiments, may be stored locally on user device 100 (e.g., in storage 106), or externally on an external user device (e.g., a compact disc ("CD"), external hard drive, digital music player), or on a web based storage medium (e.g., a cloud storage system or music server). A user may scroll through all the audio tracks available by scrolling about user interface 300 in either direction of double-sided arrow 306. For example, audio tracks 302a-g may be organized alphabetically, thus a user may view audio tracks beginning with a certain letter by scrolling upwards or downwards about a display (e.g., display 120) presenting user interface 300 to view different audio tracks beginning with different.

User interface 300 may also include one or more additional pieces of information for each audio track such as a duration for each audio track, a genre, an artist name, an album name, or any other relevant information. For example, a user may select a certain audio track based on a time that the audio track lasts. In some embodiments, each audio track includes a selection button 304. When a user presses selection button 304, that particular audio track will be selected as the basis for the music video that will be created. For example, as seen in FIG. 3A, a user may select audio track 302b by pressing selection button 304.

In some embodiments, in response to selecting an audio track, a user may be able to select a section of the song that the music video will be created for. For example, audio track 302b may be 3 minutes 36 seconds long. A user may not want to create a music video that is that long, and instead may select, for example, a 1 minute portion of audio track 302b as a basis for the music video that will be created.

Audio track 302b may be represented by a waveform 360, as seen in user interface 350 of FIG. 3B. Waveform 360 may highlight to the user various sections of audio track 302b and a corresponding audio intensity level for those sections. For example, sections corresponding to an audio track's chorus may have a higher intensity than sections corresponding to the audio track's verse. The user may select a starting point for the selected audio track by moving starting bar 362 about waveform 360. Where ever the user places starting bar 362 on waveform 360 would then correspond to a beginning of the section of audio track 302b that would be used for the created music video. Similarly, ending bar 364 may be placed at any point on waveform 360, and would correspond to an end of the section of audio track 302b to be used for the created music video. In some embodiments, beginning bar 362 and ending bar 364 may initially be located at the beginning and end, respectively, of audio track 302b. In this particular scenario, the user may choose to not move beginning and end bars 362 and 364, in which case the selected portion of audio track 302b used for creating the music video would be the entire audio track.

Figure 4:
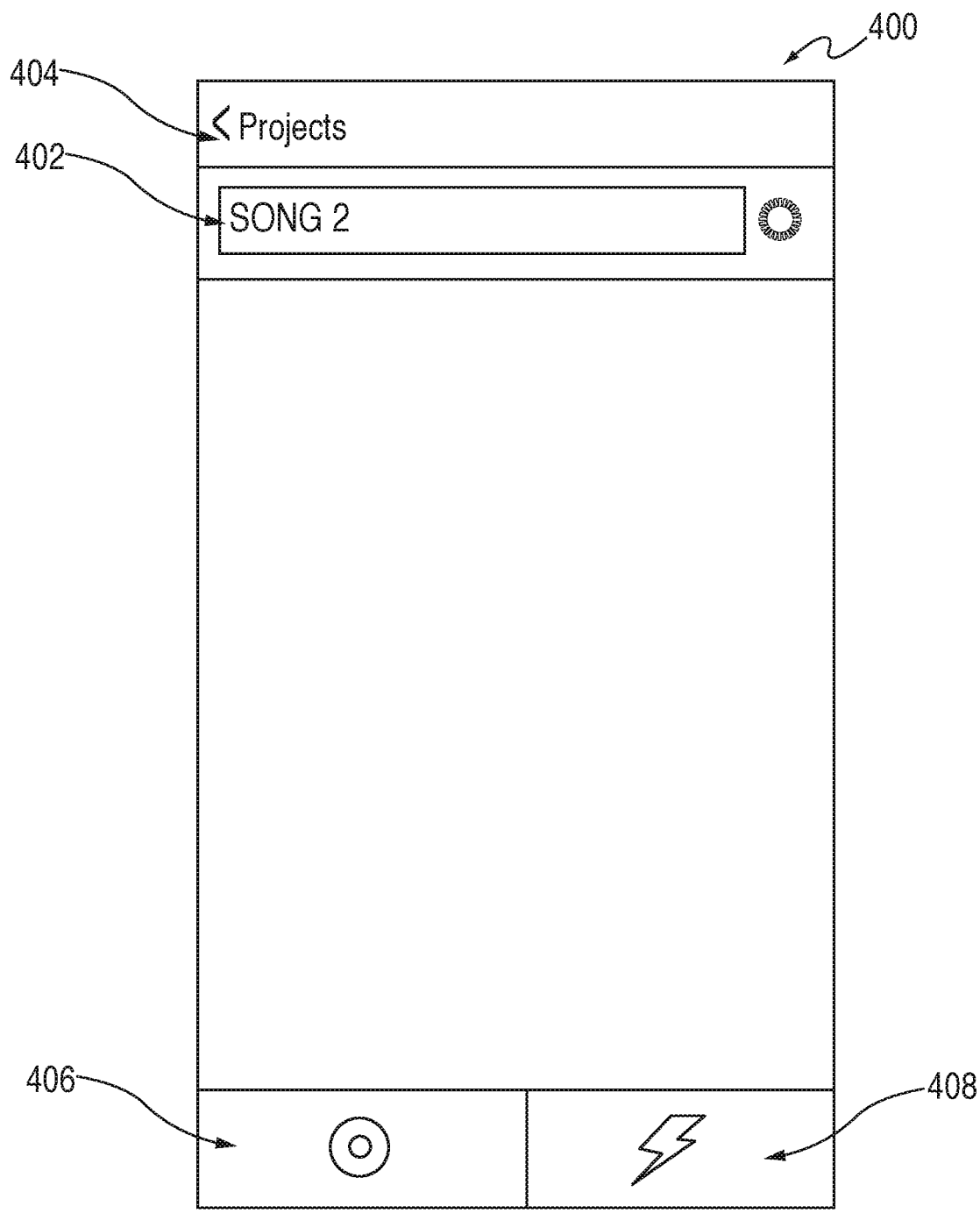
FIG. 4 is an illustrative diagram of a user interface displayed on a user device presenting a selected audio track for a music video to be created in accordance with various embodiments.

FIG. 4 is an illustrative diagram of a user interface displayed on a user device presenting a selected audio track for a music video to be created in accordance with various embodiments. User interface 400, in some embodiments, may include a listing of audio tracks that have been selected by a user to be used for a music video that will be created. For example, a user may select an audio track, such as audio track 302b of FIG. 3A, and that audio track may be displayed within user interface 400 at listing 402. In response to selecting audio track 302b, in some embodiments, various statistics may be extracted from selected audio track 302b (or any other audio track that is selected) when it is loaded into listing 402. For example, a distribution, mean, skew, or any other statistic, or any combination thereof, may be extracted from the audio track in order to be used while creating the music video for the selected audio track.

User interface 400 may also include return or back button 404, which may allow a user to return back to user interface 300 or 350. In some embodiments, a user may wish to select a different audio track from audio tracks 302a-g, and may use back button 404 to select a different audio track. For example, initially a user may have selected audio track 302b, however at a latter point in time, the user may decide that he/she wants to user audio track 302f, and may use back button 404 to return to user interface 300 to select audio track 302f. In some embodiments, a user may seek to modify a duration of the audio track they selected. For example, in user interface 350 of FIG. 3B, a user may have selected beginning bar 362 to be at a first position and ending bar 364 to be at a second position. At a latter point in time, however, the user may decide that the duration of the selected audio track from the first position to the second position is not correct and, by selecting back button 404, may return to user interface 350 to modify a position of beginning bar 362 and/or ending bar 364.

User interface 400 may also include video take button 406 and create music video button 408. After audio listing 402 has loaded (e.g., one or more statistical values have been extracted from the audio track), a user may select video take button 406 to begin to capture video takes for a music video that will be created based on the selected audio track. After a user has determined that all the video takes for the music video have been captured, the user may select create music video button 408 to create the music video based on the selected audio track and the captured video takes.

Figure 5A:
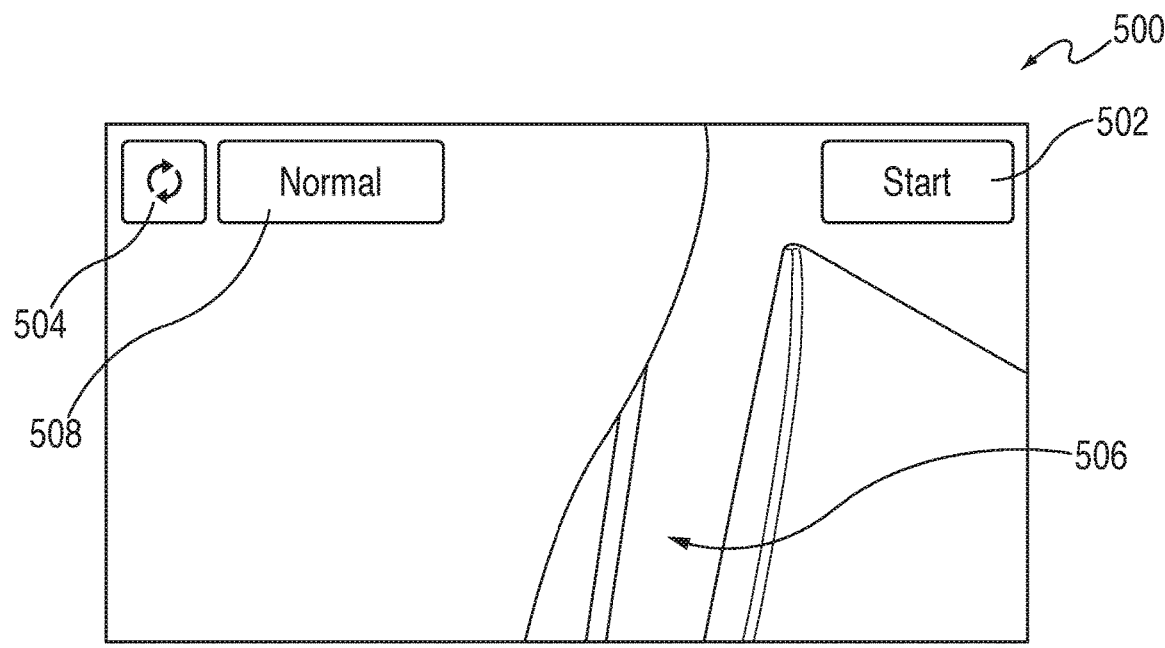
FIGS. 5A and 5B are illustrative diagrams of various user interfaces displayed on a user device for capturing video takes for a music video to be created in accordance with various embodiments.
Figure 5B:
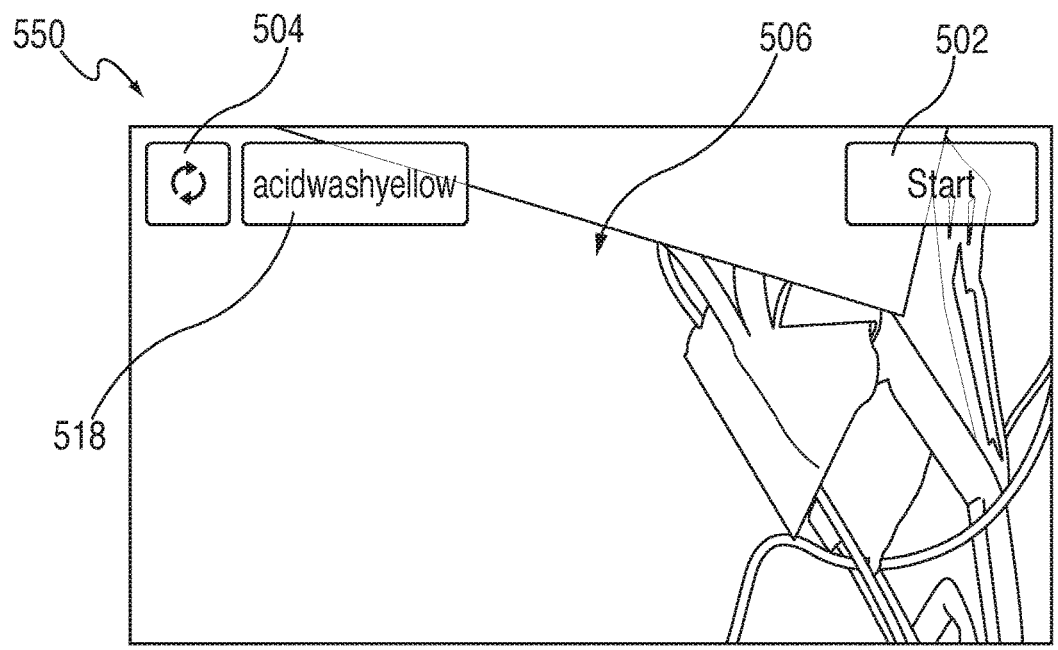

FIGS. 5A and 5B are illustrative diagrams of various user interfaces displayed on a user device for capturing video takes for a music video to be created in accordance with various embodiments. User interface 500, in some embodiments, is an exemplary image capturing interface displayed on a user device (e.g., user device 100) in response to a user selecting video take button 406 of FIG. 4. For example, in response to selecting video take button 406 of user interface 400, camera 112 on user device 100 may open or begin operating, and images that may be captured by camera 112 may be displayed within viewing area 506 of user interface 500. In some embodiments, a user may switch between two or more cameras 110 located on their user device by selecting switch camera button 504. For example, if user device 100 includes a front facing camera and a rear facing camera, switch camera button 504 may allow the user to switch between the two.

A user may begin capturing images, such as video, by selecting start button 502. For example, a user may begin to capture video for a music video to be created by first selecting start button 502. In some embodiments, a countdown may appear within viewing area 506 in response to a user selecting start button 502. The countdown may enable the user to ready themselves for the image capturing process to begin. In some embodiments, after a user selects start button 502, the selected audio track (e.g., audio track 302b), may begin to play, and the image capturing process may capture images until the audio track, or selected portion of the audio track, has completed. However, in some embodiments, one or more additional buttons, such as a stop button may be included within user interface 500.

User interface 500 also may include a filter setting 508. Filter setting 508 may correspond to one or more filters or masks for images captured for the music video to be created. In some embodiments, a user may perform one or more gestures to switch between different filter types. For example, a user may swipe across a display screen of their user device display user interface 500 to have a different filter applied.

User interface 550 of FIG. 5B corresponds to a user interface displayed on a user device having a different filter than user interface 500 of FIG. 5A. For example, in response to performing a swipe across a display screen, user interface 500 may change to user interface 550 corresponding to filter setting 508 changing to filter setting 518. Any number of filters may be used in conjunction with user interfaces 500 and 550, and the aforementioned are merely exemplary. Images captured while having filter setting 518 applied may differ from similar images captured while filter setting 508 is applied in that the formatting, shading, masking, lighting, or other features, may differ for various filters. However, persons of ordinary skill in the art will recognize that any filter may be applied to any image.

FIGS. 6A-C are illustrative diagrams of various user interfaces displaying images being captured by a user device for a music video in accordance with various embodiments. User interfaces 600, 620, and 640, in one embodiment, each include capture button 602 and viewing area 606. Capture button 602 may, for example, be substantially similar to start button 502 of FIGS. 5A and 5B, with the exception that capture button 602 may also be used to stop or pause an image capturing session. Viewing area 606, in some embodiments, includes any images that can or will be captured by the user device in response to the image capturing session beginning.

User interfaces 600, 620, and 640 may also, in some embodiments, include waveform 660, which corresponds to a waveform of a selected audio track that may be playing while a user captures one or more images during the image capturing session. For example, in response to beginning an image capturing session, the selected audio track (e.g., from FIGS. 3A and 3B), may begin to play. Position bar 618 of user interface 600 may show a current position of the selected audio track as it plays. As an audio track progresses, position bar 618 will move to various positions along waveform 660 to indicate a current position within the audio track. User interface 620 includes position bar 628 which may show a current position of the selected audio track shown by waveform 660, where position bar 628 is different than position bar 618 in that they correspond to two different times within the selected audio track and/or different video takes. Similarly, user interface 640 includes position bar 648 which depicts yet another time within the selected audio track and/or yet another video take.

By having the audio track playing while the various video takes are captured, the video takes may be captured "in sync" with the audio track. For example, at each moment of a video take, a corresponding section of the audio track that may be playing at that point in time will be known. This way, each video take, whether it begins at the beginning of the audio track or at some other point of the audio track, will be synchronized to the audio track.

In some embodiments, user interface 600 may also include a timer 614 and a video take indicator 612. Timer 614 may indicate an amount of time that an image capturing session has been active. For example, in response to an image capturing session beginning, such as by pressing start button 502 or capture button 602, timer 614 may begin to time how long the image capturing session has been going. In some embodiments, time 614 may indicate where position bar 618 is within waveform 660. For example, if the image capturing session begins at the beginning of the audio track and ends at the end of the audio track, then timer 614 may correspond to an amount of time that the audio track has been playing, and thus, the amount of time the image capturing session has been active. Video take indicator 612, in some embodiments, may indicate to a user which video take the user is currently on. For example, as seen in FIG. 6A, video take indicator 612 may indicate to the user that the images being captured by their user device in the current image capturing session, "Take 1", is a first video take. After the first video take is complete, the next time the user starts a video capturing session for a music video project, the video indicator will show a different value for video take indicator 612. For example, video take indicator 626 of FIG. 6B, indicates to the user that the images being captured in user interface 620 corresponds to a second video take, "Take 2". Furthermore, images captured in yet another image capturing session may indicate to the user that it is a third take, as seen by video take indicator 646 of FIG. 6C displaying "Take 3" within user interface 640.

In some embodiments, each video take may correspond to a different image, set of images, and/or video for a different environment or action for the selected audio track's music video. For example, in Take 1 (e.g., user interface 600), a user may capture images of a friend dancing to the selected audio track. Take 2 (e.g., user interface 620), however, may capture images of a different friend or friends, or the same friend, as Take 1, however he/she/they may be performing a different action. Take 3 (e.g., user interface 640) may correspond to a completely different action or group of images for the music video, for example, images of a river or brook. Persons of ordinary skill in the art will recognize that any number of takes may be captured for a particular music video, and the images captured may include any suitable content.

Figure 7A:
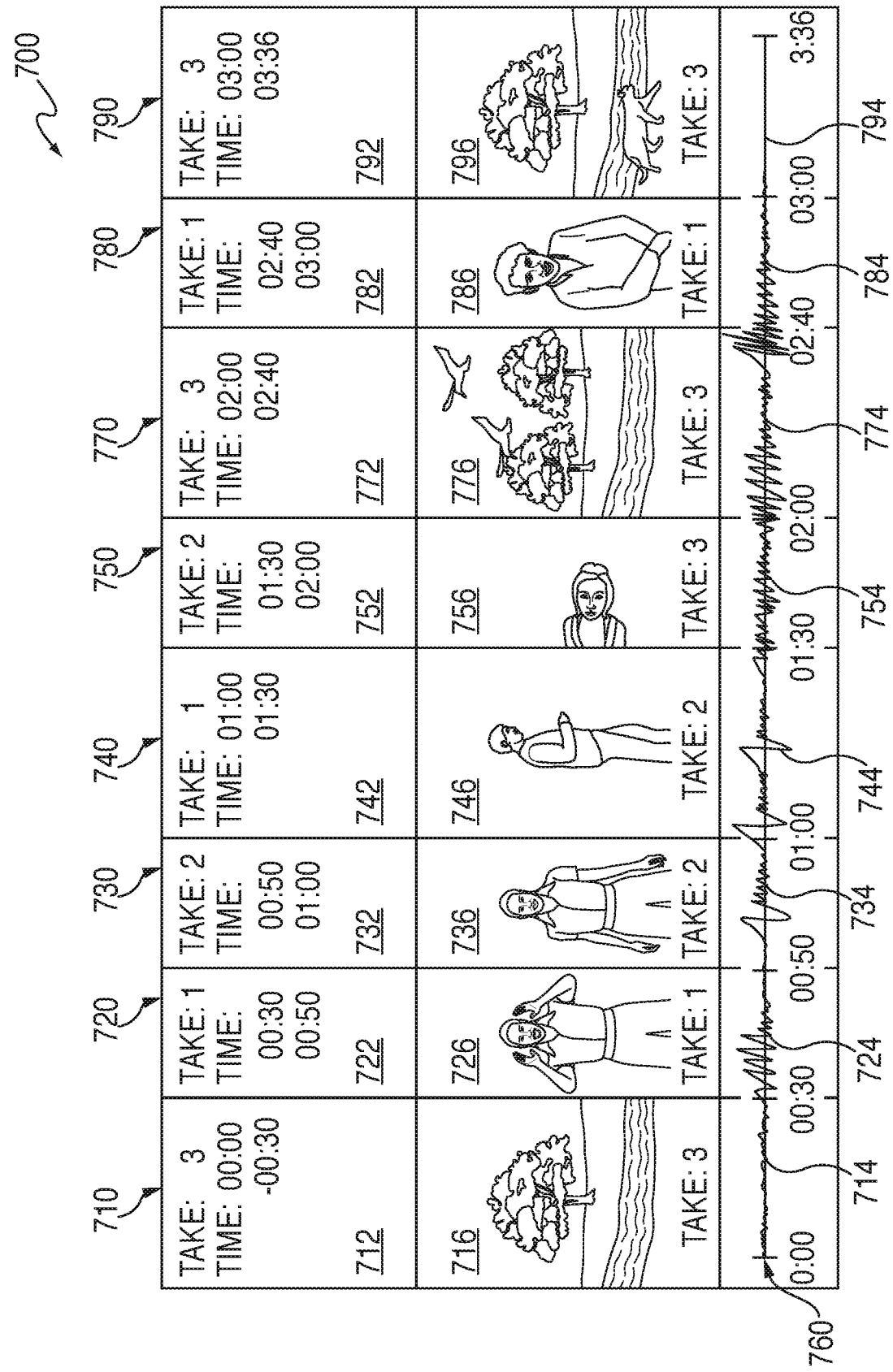
FIGS. 7A and 7B are illustrative diagrams of a created music video including multiple captured video takes synchronized to a selected audio track in accordance with various embodiments.
Figure 7B:
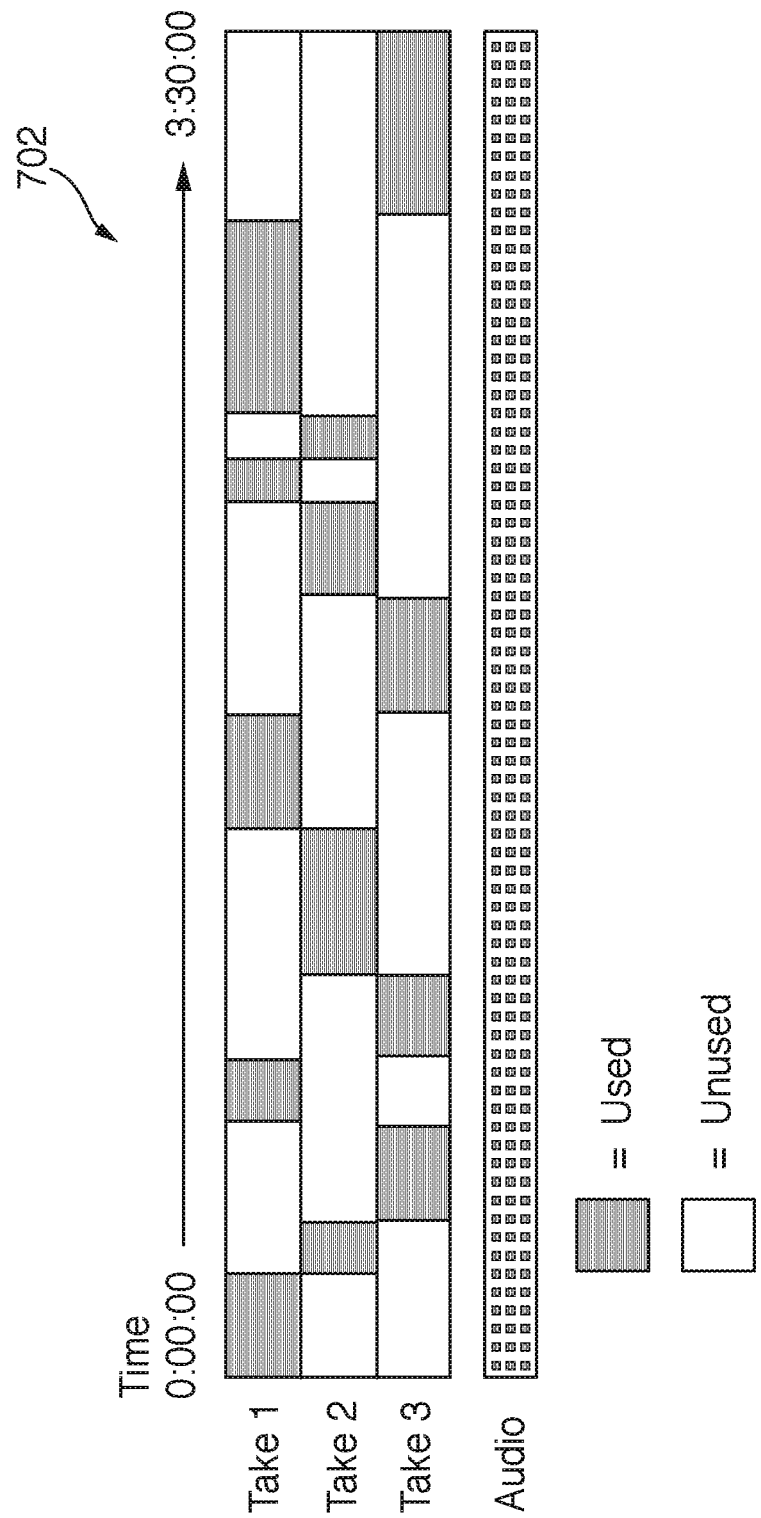

FIGS. 7A and 7B are illustrative diagrams of a created music video including multiple captured video takes synchronized to a selected audio track in accordance with various embodiments. Music video 700, in one embodiment, is an exemplary break-down of a music video in a time-line or story board type format. As a video itself is difficult to reproduce pictorially, music video 700 is an exemplary description of various "scenes" or portions of a music video that are created based on an audio track (e.g., audio track 302b of FIG. 3A), laid out such that sections of the selected audio track and their corresponding video take portions are shown paired together. However, persons of ordinary skill in the art should recognize that this is merely an exemplary reconstruction of continuous images (e.g., video), and the description presented herein is merely for illustrative purposes.

Scenes or portions 710, 720, 730, 740, 750, 770, 780, and 790 of video 700 correspond to certain images or video captured by a user while in an image capturing session (e.g., FIGS. 6A-C). Scene information 712 includes the relevant video take and timing for scene 710. For example, scene 710 of video 700 includes a portion of Take 3. In particular, the portion of Take 3 (e.g., FIG. 6C) used in scene 710 is times 00:00-00:30 of Take 3, or the first 30 seconds of Take 3. The portion of Take 3 corresponding to time 00:00-00:30 is displayed by images/videos 716.

As another example, scene 730 includes scene information 732. Scene information 732 indicates that, in scene 730, the take that is used is Take 2, and the portion of the captured images or video that is used is from time 00:30-00:50. The portion of Take 2 corresponding to time 00:30-00:50 is displayed in viewing area 736.

A scene's images may be matched to an appropriate section of the selected audio track's waveform 760 (e.g., corresponding to the selected audio track 302b of FIG. 3A). For example, scene 710 may be synchronized to section 714 of waveform 760. In some embodiments, an audio intensity of a particular section of the selected audio track for the music video may be used to determine which portion of a particular video take to use. Section 714 of waveform 760 may have a relatively low or small audio intensity, which, for example, may correspond to an introduction or instrumental portion of the audio track and therefore may have a lower volume than a section of waveform 760 corresponding to a chorus or crescendo. In some embodiments, because of the audio intensity or level of section 714, a portion of a video take may be selected to be matched with section 714 to compliment it. For example, Take 3 may include images of a river or brook, and therefore may be matched with section 714 of waveform 760 due to section 714 that is substantially lower in volume than a section of waveform 760 that has a substantially high volume (e.g., a chorus section).

In some embodiments, a random selection of a certain portion of the video takes corresponding to a certain section of the audio track may be used for the music video. For example, if the user captures three video takes (e.g., Take 1, Take 2, and Take 3), for each section of the audio track, a random selection of a portion of one or more of these video takes may be used for that section of the audio track. The selected portion of the video take will be synchronized, in one embodiment, to the section of audio track prior to being selected. In some embodiments, when the music video is created, a first section of the audio track may be matched with a corresponding first portion of Take 1, whereas a second section of the audio track may be matched with a corresponding second portion of Take 2, and a third section of the audio track may be matched with a corresponding third portion of Take 3. If, however, the user decides to create another music video using the same video takes and audio track, a different ordering and/or portion of the video takes may be used, as they may be randomly selected. For example, if a user selects create music video button 408 of FIG. 4, a music video may be created where the first section of the audio track may be matched with a corresponding first portion of Take 3, the second section of the audio track may be matched with a corresponding second portion of Take 1, and the third section of the audio track may be matched with a corresponding third portion of Take 2.

In some embodiments, if a section of waveform 760 has a particularly high or large audio intensity, a portion of a video take having a particularly high or large video intensity level may be matched with that section. For example, section 784 of waveform 760 may have a substantially high or large audio intensity level, corresponding to a final chorus or crescendo for the selected audio track. In this particular scenario, scene 780 may include images/video 786 corresponding to image captured of a user moving frequently, singing loudly, dancing intensely, or performing any other action resulting in a high level of video intensity. For example, a frame by frame analysis of images/video 786 may show a substantial change in pixel level for each frame of the video take, indicating that the images displayed therein may be changing rapidly. Scene information 782 may indicate that this particular portion of images/video may correspond to Take 1, and more specifically to times 02:40-03:00 of Take 1.

Another section of waveform 760, section 744, may also include a portion of Take 1. As seen by scene information 742, section 744 may be matched with times 01:00-01:30 of Take 1, shown by images/videos 746. Section 744 may have a particularly high or large audio intensity, which may match a level of video intensity of Take 1 between times 01:00 and 01:30. Similarly, section 724 of waveform 760 may include times 00:30-00:50 of Take 1 as shown by images/video 726, as indicated by scene information 722 of scene 720.

Other sections of waveform 760 include sections 774 and 794, each of which may correspond to section of waveform 760 having a substantially low or small audio intensity, or, a section having a substantially constant or moderate audio intensity. Each of sections 774 and 794 may be matched with a portion of Take 3, as indicated by scene information 772 and 792 of scenes 770 and 790, respectively. In particular, scene 770 includes times 02:00-02:40 of Take 3, as shown by images/video 776, and scene 790 includes times 03:00-03:36 of Take 3, as shown by images/video 796.

Sections of waveform 760 that have a substantially medium level of audio intensity may include portions of Take 2, in some embodiments. For example, sections 734 and 754 may correspond to a verse of a particular audio track for waveform 760. Based on the audio intensity of sections 734 and 754, images/videos 736 and 756 of scenes 730 and 750 may be matched with sections 734 and 754 based on a similar level of video intensity included therein. For example, as indicated by scene indicators 732 and 752 of scenes 730 and 750, images/videos 736 and 756 of scenes 730 and 750 correspond to times 00:50-01:00 and 01:30-02:30 of Take 2, respectively.

In some embodiments, a time or duration of each portion of selected images/video may be equal to the corresponding section of waveform 760 that it has been synchronized to. For example, section 774 of waveform 760 begins at time 02:00 and ends at time 02:40. Thus, the portion of Take 3 shown within scene 770 is also equal to a 40 second time period, as indicated by scene information 772. Similarly, section 734 of waveform 760 begins at time 00:50 and ends at time 01:00. Correspondingly, Take 2 of scene 730 is paired such that 10 seconds of Take 2 are used (e.g., times 00:50-01:00). Persons of ordinary skill in the art will recognize that any amount of time for any section of audio or portion video may be used, and the illustrated time periods are merely exemplary. Furthermore, any suitable criteria for synchronizing certain sections of audio with certain portions of video/images may be used, and use of audio intensity and video intensity levels are merely one illustrative example. Still further, any number of sections of a waveform of a selected audio track may exist or be formed, and the illustrated sections of waveform 760 are merely one particular example.

In some embodiments, a user unsatisfied with a particular scene of music video 700 may change the video take chosen for a particular scene by providing one or more gestures to the user device displaying the music video. For example, a user unhappy with Take 3 being used for scene 770 may swipe up on the display screen displaying music video 700 at section 774 to cause the selected video take to be changed. In response to swiping up on the display screen, scene 770 may change from using Take 3, to now using Take 1 or 2, for example, at times 02:00-02:40. Persons of ordinary skill in the art will recognize that any gesture may be used, and the aforementioned is merely exemplary. For example, a swipe, flick, click, tap, or sweeping gesture, or any other suitable gesture may be used to change a video take used, and the aforementioned is merely exemplary.

FIG. 7B is an illustrative block diagram of music videos 700 of FIG. 7A in accordance with various embodiments. Block diagram 702 of music video 700 describes how portions of various video takes are used to form music video 700. In some embodiments, block diagram 702 may include three video takes—Take 1, Take 2, and Take 3. For example, a user may capture each video take at a different location and the captured images may differ for each video take. In the illustrative example, each video take may also be of equal duration as an audio track, such as a selected audio track used for waveform 760.

In some embodiments, a darkened portion of block diagram 702 may correspond to portions of a video take used when music video 700 is created. An unused portion of a video take may, subsequently, correspond to a white or empty portion of block diagram 702. In the non-limiting illustrative embodiment, block diagram 702 for music video 700 may have a portion of Take 1 used at a beginning of the created music video, which may be followed by a portion of Take 2, and then a portion of Take 3. As seen in diagram 702, when a portion of one video take is used, a portion of the other video takes corresponding to a same section of the audio track, is unused. Thus, when a portion of Take 1 is used at the beginning of the music video, portions of Takes 2 and 3 for that same section of the audio track are unused. This allows music video 700 to be created such that a continuous music video, having portions of different video takes, which may be captured at various times and at various locations, are paired together to create a professional and aesthetically unique music video.

Figure 8A:
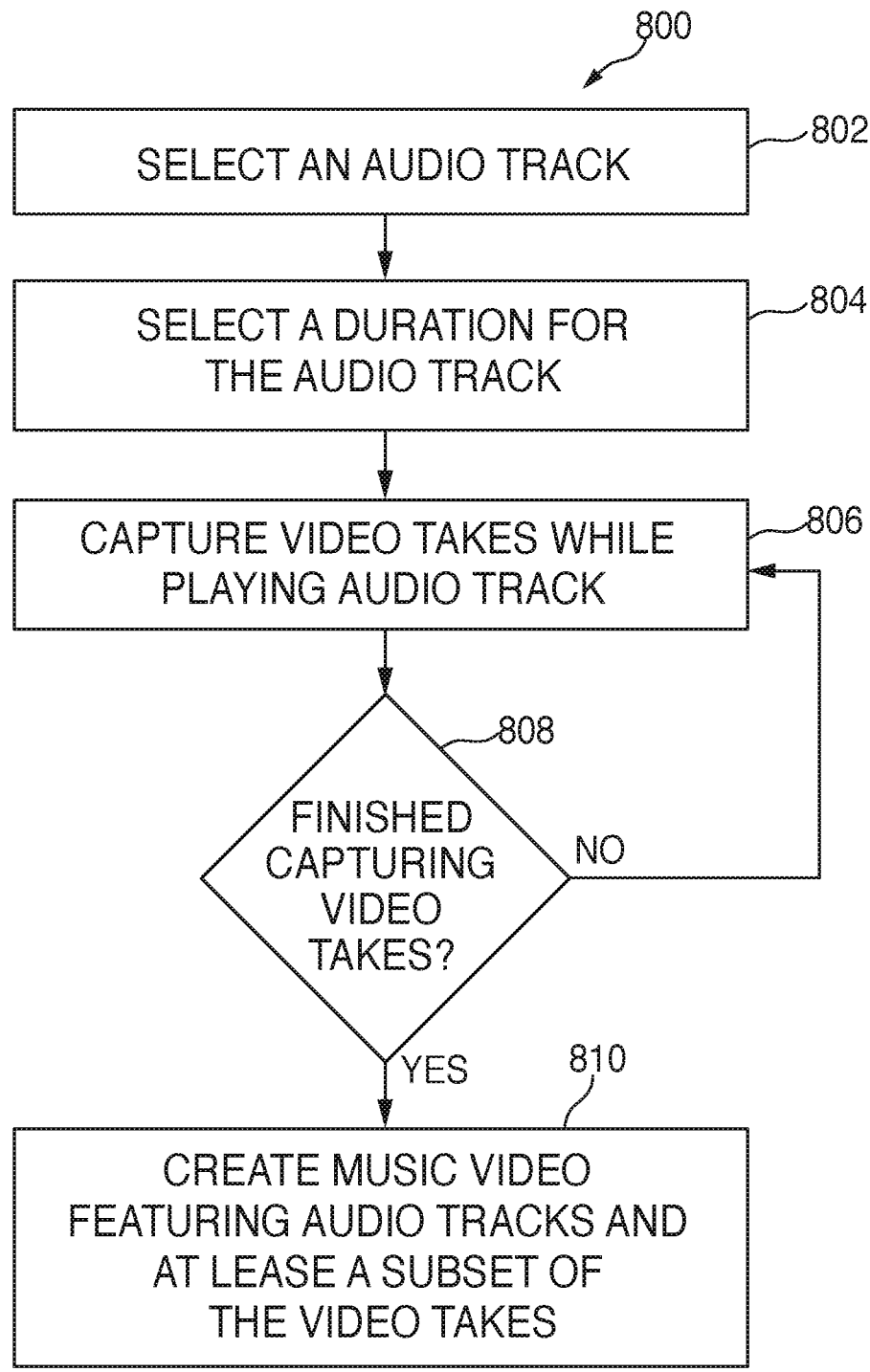
FIGS. 8A and 8B are illustrative flowcharts of a process for creating music videos in accordance with various embodiments.

FIG. 8A is an illustrative flowchart of a process for creating music videos in accordance with various embodiments. Process 800 may begin at step 802. At step 802, an audio track may be selected. For example, a user may select an audio track stored on their user device to be used as a basis for creating a music video. As another example, the selected audio track may be stored on an external device, such as an external hard drive, CD, or digital music player, or the audio track may be stored on a cloud storage system, such as a music server. However, in one embodiment, an audio track may be created by a user using their user device (as described in greater detail below with regards to FIG. 11), and the created audio track may be used to create a music video.

Process 800 may then proceed to step 804. At step 804, a duration may be selected for the audio track selected at step 802. For example, a user may decide to only include a portion of the selected audio track for the music video that will be created. The user may, in one particular instance, move a beginning bar 362 of FIG. 3B to a first or starting position for the selected audio track, and then move ending bar 364 to a second or end position for the selected audio track. As another example, a user may decide to only include a chorus section of an audio track for a music video that will be created. A user may modify a start point and end point for the particular audio track such that the audio track begins at the start of the chorus and ends at the end of the chorus. As yet another example, step 804 of process 800 may be omitted in some embodiments. For this particular scenario, the duration of the selected audio track may default to the entire audio track's duration, and the user may not be required to select a beginning or end to the audio track for the music video. In some embodiments, step 804 may be skipped or omitted and the duration of the selected audio track may default to be the entire duration of the audio track.

At step 806, a video take may be captured while the selected audio track plays. In some embodiments, in response to selecting the audio track and/or in response to selecting a duration for an audio track (e.g., steps 802 and/or 804), an option to capture a video take may be presented to a user. A user may select the capture video take option to begin to capture video for a music video to be created based on the selected audio track. For example, a user may select start button 502 of FIGS. 5A and 5B, or capture button 602 of FIGS. 6A-C to begin to capturing video takes. In some embodiments, a user may be perform one or more gestures, such as a swipe across a displayed user interface, to cause a filter or mask to be applied to the captured video. For example, filter settings 518 may be applied to captured images, as displayed in viewing region 506 of FIG. 5B, in response to a user performing an action on user interface 500 having normal filter setting 508 (e.g., no filter).

As a user begins to capture video for a video take, the selected audio track, or selected section of the audio track selected, may begin playing. For example, after a user selects capture button 602 of FIG. 6A, the selected audio track may begin to play. In some embodiments, by playing the selected audio track while an video take is captured, that video take may be synchronized with the audio track automatically. For example, each moment of the captured video take may be synchronized to a corresponding section of the selected audio track, as the video take is captured in time with the audio track as it plays. In some embodiments, a position indicator 618 may indicate a current position of the audio track playing while the video take is being captured. The audio track may output through a user device's speakers, such as speakers 122, while one or more cameras 112 capture the video take.

Process 800 then proceeds to step 808. At step 808, a determination is made as to whether or not the user is finished capturing video takes. If, at step 808, it is determined that the user is not finished capturing video takes for the music video to be created, then process 800 returns to step 806 and additional video takes are captured. For example, after a user finishes capturing Take 1 seen in FIG. 6A, the user may decide to capture another video take. The user may then repeat step 806 such that a new video take is captured (e.g., Take 2), where the selected audio track also plays while the new video take is being captured. For example, Take 2 as seen in FIG. 6B may be a second video take captured after a user has captured Take 1 of FIG. 6A. The user may capture as many additional video takes as desired. In some embodiments, a user may delete one or more video takes and/or replace one or more video takes with one or more additional video takes.

If, however, at step 808, it is determined that the user has captured all the video takes needed to create the music video of his/her choice, then process 800 proceeds to step 810. At step 810, a music video is created featuring the selected audio track and at least a subset of the video takes. The subset may include any portion of any number of the video takes. For example, times 00:00-00:30, 01:30-02:00, and 03:00-03:36 of Take 3 may be used for scenes 710, 770, and 790 of music video 700. Thus, in this particular example, even though images/videos may be captured for the entire duration of the selected audio track, only certain portions of captured video takes may be used for certain sections of the audio track. Similarly, times 00:50-01:00 and 01:30-02:00 of Take 2 may be used for scenes 730 and 750.

In some embodiments, the portions of each video take used for the music video are matched with a corresponding section of the audio track based on one or more of the audio track's audio intensity, vocal phrasing, melodic phrasing, instrumental composition, tempo, and/or time signature, as well as one or more of the videos takes' video intensity, number of faces recognized therein, type of image captured within the video take, color template of the captured images within the video take, and/or any other characteristic of the video and/or audio, or any combination thereof. For example, an audio intensity of the selected audio track may be seen within waveform 760 of FIG. 7. Sections 714, 774, and 794 may include low or small audio intensity levels, and therefore may be matched to portions of Take 3 having low or small video intensity levels. Sections 724, 744, and 784, however, may include sections of high or large audio intensity levels, and therefore may be matched to portions of Take 1 having high or large video intensity levels. However, persons of ordinary skill in the art will recognize that any matching or pairing criteria may be used, and the aforementioned are merely exemplary.

Figure 8B:
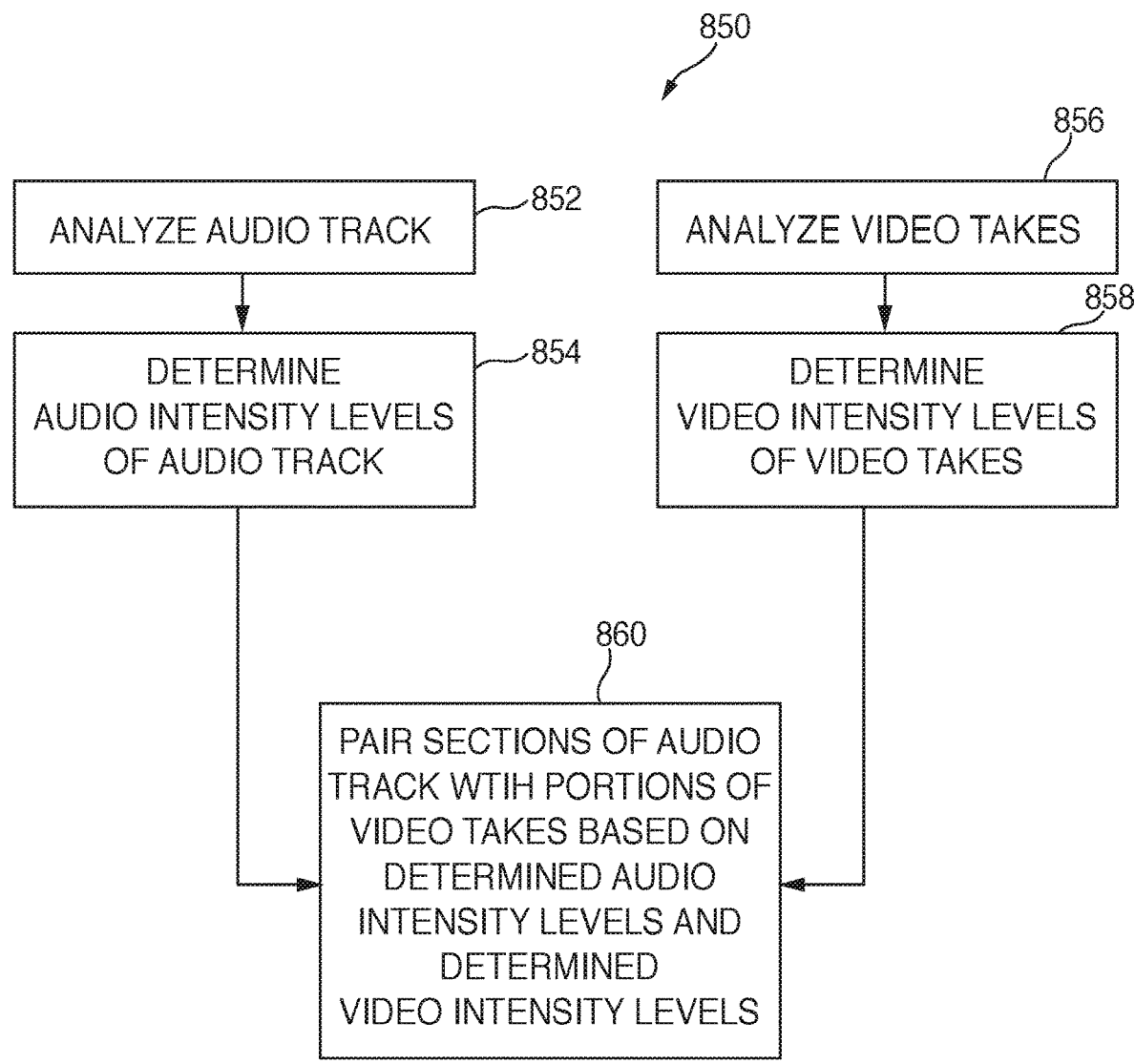

FIG. 8B is an illustrative flowchart of a process for pairing audio tracks and video takes for a music video to be created in accordance with various embodiments. Process 850 begins, in some embodiments, at step 852. At step 852, a selected audio track's audio is analyzed. A user may select an audio track to be used for a music video that will be created (e.g., audio track 302b of FIG. 3A). The audio track may then be analyzed to determine areas of high audio intensity, low audio intensity, silence, repeating melodic or vocal phrases, musical compositions, and/or specific instrumental sounds, or any other characteristic, or any combination thereof. As used herein, high and/or low audio intensity levels may correspond to any situation where the audio intensity levels exceed a certain threshold level, which in some embodiments may be set by the user, the user device, or preset prior to analysis being performed. The audio intensity levels may correspond to a mean audio intensity level for a certain section of the audio track, an absolute audio intensity level, a median audio intensity level for a section of the audio track, and/or audio intensity levels of sections of the audio track as compared to other sections of the audio track. As an illustrative example, a certain section of an audio track may have an audio intensity level of 90 dB, which may, for instance, correspond to a crash cymbal being struck within the audio track. This audio intensity level may exceed a predefined threshold for audio intensity (e.g., 80 dB), and because it exceeds the predefined threshold for audio intensity, this section may be used as a transition point for one or more video takes that will be synchronized to the audio track.

At step 854, the audio intensity levels for the entire audio track may be determined. In some embodiments, the audio track may be broken up into sections, and each section may be analyzed sequentially or in parallel. In some embodiments, each section of the audio track may be compared with other sections of the audio track to determine whether any sections have similar audio intensity levels. For example, if a first section of the audio track has a certain audio intensity level that is substantially similar to a second section of the audio track, those two sections may be recorded as having similar audio intensity level profiles. This, in some embodiments, may correspond to a repeated section of the audio track, such as a verse phrase or a chorus for the audio track. In this way, similar transition schemas may be used for both sections.

In some embodiments, the entire audio track may be analyzed to determine an average audio intensity level at each point in the audio track (e.g., each second, millisecond, etc.). For example, each second the audio track may be analyzed to determine the audio intensity level of that particular section of the audio track. If the audio intensity level is especially high at one point (e.g., above 80 dB), then certain attributes may be placed on that section (e.g., a crash cymbal being struck). However, if the audio intensity level is particularly low (e.g., less than 40 dB), then other attributes may be placed on that section (e.g., a silent portion or rest). However, persons of ordinary skill in the art will recognize that any suitable characteristic may be applied to any section of the audio track such that a comprehensive analysis of the audio track's musical composition may be obtained.

In some embodiments, the audio intensity levels for the entire audio track may be stored in a separate log file, which may be used for pairing of the audio track with various video takes for creating the music video. For example, a log file including a time breakdown (e.g., second by second, beat by beat, etc.) and a corresponding audio intensity level (e.g., a decibel level) for that time may be created in response to the analysis of the audio track. The log file, in some embodiments, may be stored with the audio track in memory on the user device, however, in one embodiment, a new enhanced audio file may also be creating including the log file. For example, the enhanced audio file may include the audio track in its original form and the log file indicating the audio intensity level of the audio track at each point of the audio track's duration.

At step 856 of process 850, each video take of multiple video takes captured by the user may be analyzed. For example, each video take may be analyzed to determine a video intensity level of each portion of the each video take (e.g., frame by frame, second by second, scene by scene, etc.). As another example, the video takes may be analyzed to determine a number of faces that are recognized to be within each video take. As yet another example, the video takes may be analyzed to determine a geo-location where each video take was captured. Further still, each video take may be analyzed to determine a composition of each pixel of each frame of the captured video takes, such that each frame may be compared to determine a color intensity level of each portion of the video takes.

In some embodiments, process 850 may begin at step 856 instead of at step 852. In yet some other embodiments, process 850 may begin with both steps 852 and 856 occurring in parallel with one another.

After step 856, process 850 may proceed to step 858 where video intensity levels for the captured video takes may be determined. In some embodiments, the video intensity levels may be determined for each video take of the plurality of video takes captured by the user device, however not all video takes, and not all portions of each video take may be analyzed. For example, a first video take may have video intensity levels for the entire video take determined while a second video take may only have a portion of its video intensity levels determined.

Video intensity levels, in some embodiments, may correspond to any suitable criteria for gauging the various video takes. For example, video takes including an individual dancing may be determined to have a higher video intensity level than a video take of nature scene, such as a river or ocean. As another example, video takes including a vast number of colors may correspond to a high video intensity level, whereas video takes including substantially monochrome coloring may correspond to a low video intensity level. In some embodiments, video takes including a large number of faces, or faces recognized within the video, or faces of contacts of the user capturing the video takes, may correspond to video takes having high video intensity levels. Conversely, video takes having few or no faces determined to be within the captured video takes may correspond to video takes having a low video intensity level.

In some embodiments, steps 858 and 854 may occur at a substantially same time. For example, if steps 852 and 856 are performed substantially in parallel with one another, steps 854 and 858 may be performed in parallel with one another as well. However, in other embodiments, process 850 may begin at step 852 and proceed to steps 854, 856, and 858 sequentially. Process 850 may also, in some embodiments, begin at step 856, and proceed to steps 858, 852, and 854 sequentially, or any permutation or combination thereof. Persons of ordinary skill in the art will recognize that any ordering of steps 852-858 may be implemented, and the aforementioned are merely examples.

At step 860, sections of the audio track may be paired or matched with portions of the video takes based on the determined audio intensity levels of the audio track and the video intensity levels of the video takes. For example, sections of the audio track having high audio intensity levels may be paired with portions of a video take having high video intensity levels. As another example, sections of the audio track having low audio intensity levels may be paired with portions of a video take having low video intensity levels. In some embodiments, sections of the audio track determined to have high/low audio intensity values may cause a greater pairing weight to be placed on videos having high/low video intensity for that section of the audio track. Thus, the probability of a section of high/low audio intensity is more likely to have a corresponding portion of a video take having high/low video intensity paired together.

As an illustrative, non-limiting example, a chorus section of an audio track may have a substantially high audio intensity level. The chorus section of the audio track may be paired with a portion of a video take or takes including a large number of faces determined to be within the video take.

FIGS. 9A-D are illustrative diagrams of user interfaces and an audio track's waveform describing techniques for synchronizing portions of video takes to sections of an audio track based on a number of faces or images determined to be within a video take in accordance with various embodiments. User interface 900 of FIG. 9A includes three (3) faces 902a-c recognized within image viewing region 906 of video take 904 (e.g., Take 1). In some embodiments, for each face recognized within viewing region 906, a corresponding outline 908a-c may appear on top of the recognized face. For example, one or more processors on a user device (e.g., processor(s) 102 of user device 100) may be capable of detecting one or more faces that are displayed on a display of the user device (e.g., display 120). For example, processor 102 of user device 100 may include one or more facial recognition modules or applications capable of determining whether one or more faces are currently displayed on display 120. In some embodiments, outlines 908a-c may also include a name of an individual recognized within viewing region 906. In some embodiments, the one or more faces may be determined to be within a video take while the selected audio track plays. In this way, the video take may be synchronized, automatically, with the audio track such that at each point in time of the audio track, an amount of faces within a video take being captured is known. Persons of ordinary skill in the art will recognize that although the aforementioned examples describe "faces" being recognized or determined within a displayed user interface, any image may be analyzed to determine whether or not any objects or items are included therein, and the use of faces is merely one particular example.

Figure 9A:
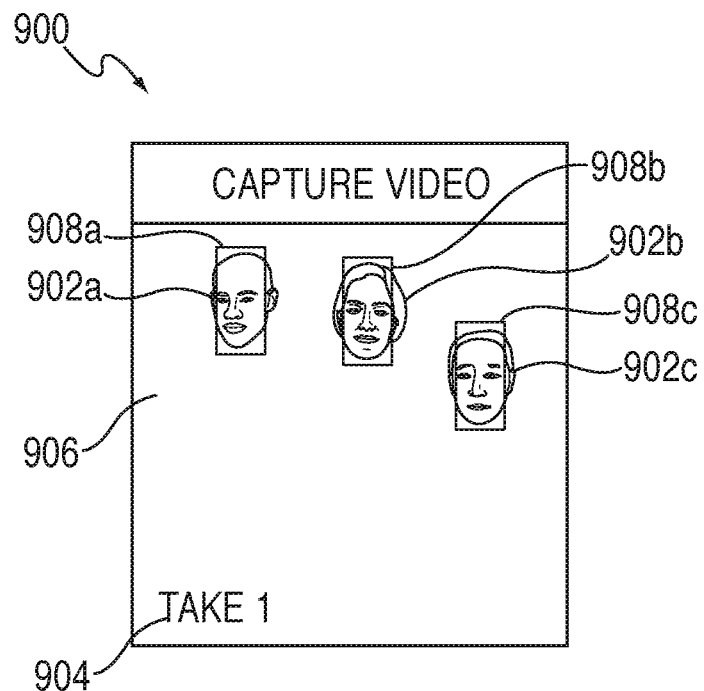
FIGS. 9A-C are illustrative diagrams of user interfaces including various video takes having a number of faces or images determined to be within the video takes in accordance with various embodiments.
Figure 9B:
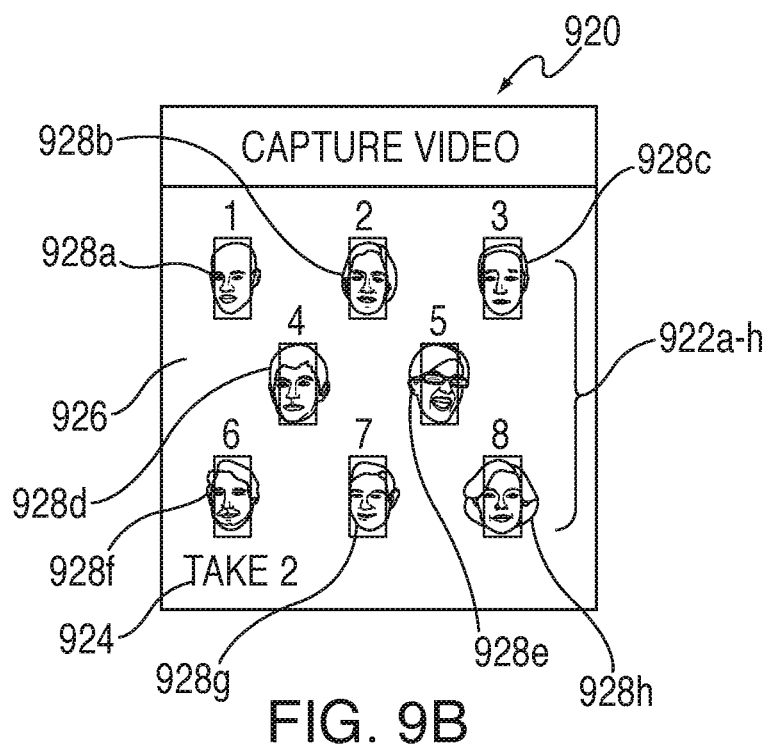

FIG. 9B shows user interface 920 including recognized faces 922a-h determined to be within video take 924 (e.g., Take 2). In some embodiments, in response to determining that faces 922a-h are being displayed within viewing region 926, outlines 928a-h may appear about each face 922a-h, respectively, such that a user viewing user interface 920 knows that the user device has recognized each face. In some embodiments, take 924 may include more faces, or may include more recognized faces than take 904 of FIG. 9A. For example, Take 2 of FIG. 9B may recognize eight (8) faces within viewing region 926, as opposed to three (3) faces within viewing region 906 of FIG. 9A.

Figure 9C:
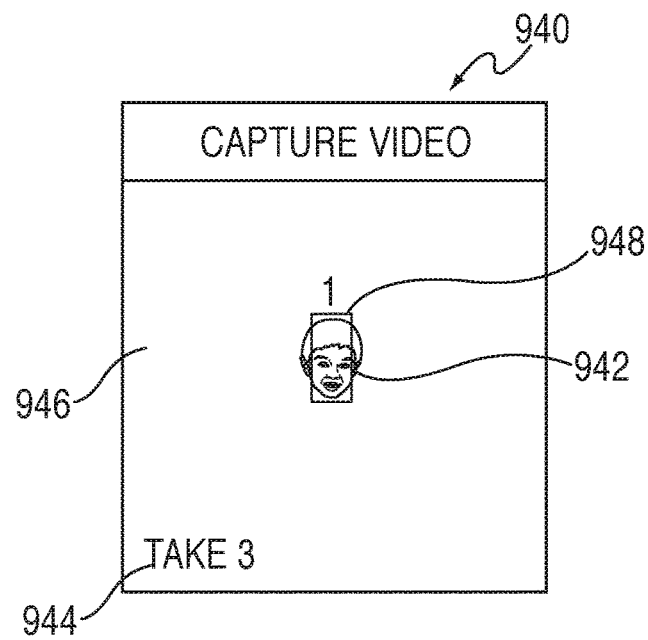

FIG. 9C, however, shows user interface 940 including face 942, which is determined to be within video take 944 (e.g., Take 3)(. In some embodiments, video take 944 may display face 942 within viewing region 946, in addition to outline 948, which appears about face 942. In this particular scenario, only one face, face 942, is recognized by the user device displaying user interface 940 as being displayed within viewing region 946.

The number of faces recognized within a video take may, in some embodiments, be used as a criteria for determining which section of a selected audio track to match a portion of a video take with. In some embodiments, based on the number of faces determined to be within a displayed video take, a certain value may be assigned to that portion of the video take. For example, if a first portion of a certain video take is determined to include a large number of faces, that portion of the video take may be assigned a value corresponding to the fact that there are a large number of faces in that video. As another example, if a certain video take is determined to include a small number of faces, that video take may be assigned a value corresponding to the fact that there are very few faces in that video.

The assigned values of each video take may then be used as a basis for matching or pairing the video takes with certain sections of the selected audio track. For example, sections of the audio track having a particularly high audio intensity value may be paired with portions of video takes that were assigned a value indicating they have a high number of faces. As another example, sections of the audio track having a particularly low audio intensity level may be paired with portions of video takes that were assigned a value indicating that they have a low number of faces.

As an illustrative example, video take 924 may be assigned a value of eight corresponding to the number of faces determined to be within Take 2. Video take 944, however, may be assigned a value of one corresponding to the one face determined to be within Take 3. If a section of the audio track has a particularly high audio intensity level, video take 924 may be matched to that section due to the face that it has an assigned value of eight, as opposed to synchronizing video take 944 with that audio section because video take 924 has an assigned value greater than video take 944.

Figure 9D:
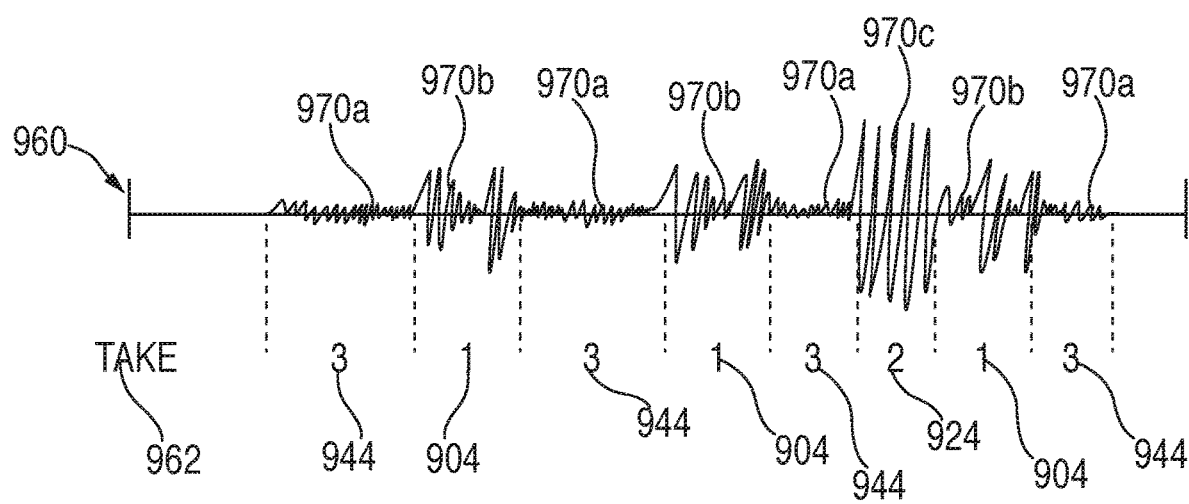
FIG. 9D is an illustrative diagram of various sections of a selected audio track's waveform synchronized with portions of video takes based on the number of faces determined to be within each video take in accordance with various embodiments.

FIG. 9D is an illustrative diagram of various sections of a selected audio track's waveform paired with portions of video takes based on the number of faces determined to be within each video take in accordance with various embodiments. Waveform 960 of FIG. 9D shows an exemplary waveform of a selected audio track for a music video that will be created including a subset of video takes 904, 924, and/or 944 paired with particular sections of waveform 960. Waveform 960, as seen in FIG. 9D, includes an audio intensity of the audio track over the duration of the audio track, as well as a video take 962 that will be paired with that section of the audio track. In some embodiments, only a portion of a particular video take may be paired with a particular section of the audio track, however video take 962 merely illustrates how different video takes may be matched different sections of the audio track based on an audio intensity of a section of the audio track and a number of faces recognized within a video take.

Each portion of a video take will be paired with the selected audio track for the time with the audio track that the video take is captured. In this manner, pairing of a portion of a certain video take with a certain section of the audio track may continually be aligned such that the video take is in time with the audio track. In this way, the assigned values of each video take (or each portion of a video take) may be used to pair that particular video take (or portion of the video take) to a corresponding section of the audio track.

In some embodiments, sections of waveform 960 having low or small audio intensity levels may be matched with portions of video takes 904, 924, and 944 which have a relatively low or small number of faces recognized therein, or a low or high value assigned to the video takes based on the number of faces recognized therein. For example, sections 970a of waveform 960 may be paired with video take 944. Sections 970a, in one embodiment, correspond to sections of the selected audio track having a relatively low or small audio intensity level. Thus, these sections 970a are paired with video take 944 having a substantially low or small number of faces recognized therein, such as singular face 942.

In some embodiments, sections of waveform 960 having a high or large audio intensity level may be paired with portions of video takes 904, 924, and 944 having relatively high or large numbers of faces recognized therein. For example, section 970c of waveform 960 may have a substantially high audio intensity level. Thus, section 970c may be paired with video take 924 having eight (8) faces 922a-h recognized therein.

In some embodiments, sections of waveform 960 having audio intensity levels higher than that of sections 970a, but lower than section 970c, may correspond to sections having a medium level of audio intensity. For example, sections 970b may correspond to a verse portion of a selected audio track. In some embodiments, because sections 970b have a medium level of audio intensity, video take 904 having three (3) faces recognized therein may be synchronized to section 970b.

Persons of ordinary skill in the art will recognize that any take including any number of faces may be paired with any section of an audio track, and the aforementioned is merely exemplary. Furthermore, persons of ordinary skill in the art will recognize that any object may be recognized within a captured video take, and faces are merely one object or item that may be recognized. Various other types of recognizable objects or items include, but are not limited to, bodies of individuals, faces of only contacts of a user, animals, geographical landmarks or GPS locations, pixel intensity, frequency of a corresponding video signal, or any other suitable object/item, or any combination thereof.

Figure 9E:
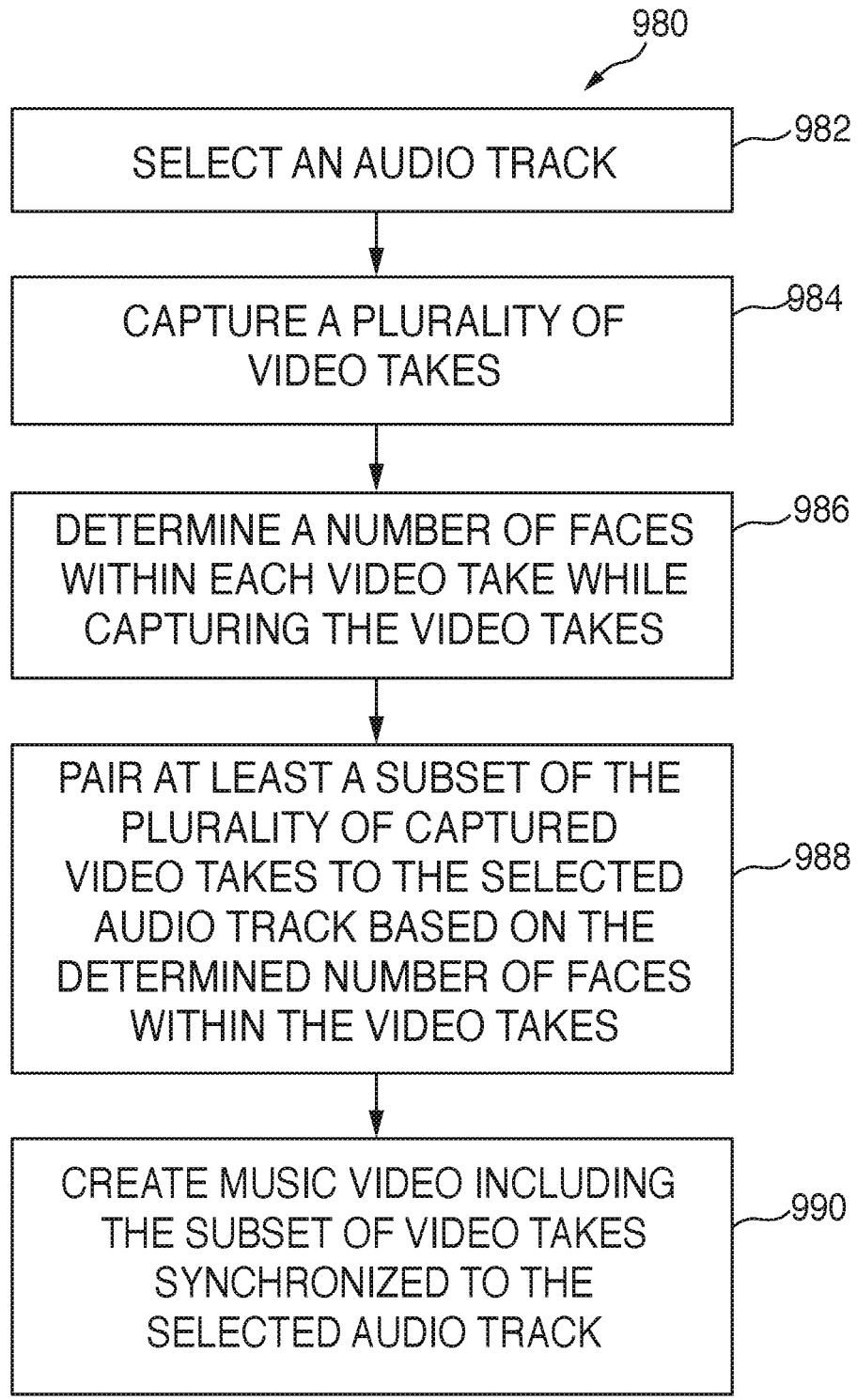
FIG. 9E is an illustrative flowchart of a process for synchronizing video takes to an audio track based on a number of faces determined to be within the video takes in accordance with various embodiments.

FIG. 9E is an illustrative flowchart of a process for pairing video takes to an audio track based on a number of faces determined to be within the video takes in accordance with various embodiments. Process 980 of FIG. 9E may, in some embodiments, begin at step 982. At step 982, an audio track is selected. For example, an audio track, such as audio track 302b of FIG. 3B, may be selected by a user. The audio track may be stored on a user device, external device, or music server, for example.

At step 984, multiple video takes may be captured by the user. In some embodiments, the selected audio track may play through one of the user device's audio outputs (e.g., speakers 122) while the plurality of video takes are captured using one or more of the user devices image capturing components (e.g., cameras 112). The captured video takes may be of any duration, and may include any suitable content such as one or more individuals, one or more scenic backgrounds, and/or animated videos, for example. In some embodiments, steps 982 and 984 of FIG. 9E may be substantially similar to steps 802 and 804 of FIG. 8A, and the previous description may apply.

At step 986, a number of faces within each video take captured may be determined. For example, if a first video take, such as Take 1 of FIG. 9A, includes three (3) faces, one or more facial recognition modules resident on the user device may create a corresponding outline around each individuals face. The outlines, such as outlines 908*a-c* of FIG. 9A, allow a user to visualize the number of faces that have been recognized within the captured video take. In some embodiments, the number of faces determined to be within a video take may only include faces corresponding to contacts of a user operating a user device capturing the video take(s). For example, contact information including a contact's photograph may be stored in memory 104 of user device 100. When a face appears within a captured video take that is substantially similar to a face recognized within a certain contact's photograph, that face will be recognized by the user device as being within the captured video take. However, in other embodiments, the captured video take may recognize any and all faces within any number of video takes. Furthermore, in at least some embodiments, other objects or images may be recognized within a video take (e.g., landmarks, bodies, pets, etc.) and the use of detecting one or more faces within a captured video take is merely one example.

The determination of the number of faces within a video take may occur, in some embodiments, at a substantially same time as the capturing of the video take(s). For example, as the video take is captured, the number of faces within the video take is determined at each point in time of the audio track. In this way, the number of faces within the video take is known prior to any pairing occurring. Furthermore, each video take is synchronized to the audio track such that the number of faces determined to be within each portion of a video is known, and which section of the audio track is playing for that portion of the video take is also known.

In some embodiments, a value may be assigned to each video take based on the number of faces determined to be within that video take. For example, Take 2 of FIG. 9B may be assigned a value of eight (8) based on the eight (8) faces determined to be within Take 2. As another example, Take 3 of FIG. 9C may be assigned a value of one (1) based on the one (1) face determined to be within Take 1.

In some embodiments, portions of a video take may be assigned different values based on a different number of faces determined to be within each portion of the video take. For example, in a first portion of a video take, three (3) faces may be determined to be present, and the first portion may be assigned a value of three (3). However, at a second portion of the video take, twelve (12) faces may be determined to be present, and the second portion may then be assigned a value of twelve (12).

In some embodiments, the assigned value of each video take, or portion of a video take, may correspond to whether that particular video take includes a number of faces greater or less than a certain threshold value. For example, a first threshold may be set at there being one (1) face within a video take, whereas a second threshold and a third threshold may be set at two (2) faces and five (5) faces being within a video take. Each threshold may be assigned a value of low, medium, and high, respectively, corresponding to the number of faces present within that video take. In this particular example, Take 3 of FIG. 9C may be assigned a value of low as only one (1) face is present, Take 1 of FIG. 9A may be assigned a value of medium as more than two (2) but less than five (5) faces are present, and Take 2 of FIG. 9B may be assigned a value of high as more than five (5) faces are present.

At step 988, a subset of the plurality of captured video takes may be paired to the selected audio track based on the determined number of faces within the video take. In some embodiment, video takes, or portions of video takes, having a certain assigned value may be paired to section of the selected audio track having a complimentary or corresponding audio intensity level. For example, as described above, various sections of the selected audio track may be determined to have a low, medium, and/or high audio intensity value. These audio intensity values may correspond to the various sections of the audio track (e.g., a verse may have a medium audio intensity, a chorus may have a high audio intensity). In some embodiments, if the assigned value for a particular video take is a certain value, then that video take may be paired to a specific section of the audio track. For example, if there are a large number of faces determined to be within the video take (e.g., Take 2), then that video take may be assigned a high audio intensity value, and may be paired to a section of the audio track having a high audio intensity (e.g., a chorus section). As another example, if the number of faces within a video take is low (e.g., Take 3), then that section may be paired to a section of the audio track having a low audio intensity (e.g., an instrumental section).

In some embodiments, as mentioned above, each video take may have various portions that are assigned different values. In this particular scenario, portions of different audio takes may be paired to sections of the selected audio track based on which assigned value of a portion of a video take best matches a certain section of the audio track. For example, if only a first portion of a first video take has an assigned value of high video intensity, that portion may be paired to the section of audio track having high audio intensity. In this way, the subset of video takes may include various portions of some or all of the captured video takes such that the most appropriate portions of video takes are paired to the most appropriate sections of the audio track.

At step 990, a music video is created. The created music video includes the subset of video takes (e.g., the portions of the video take or takes determined at step 990), and the selected audio track. The music video, in one embodiment, combines the various video takes and the selected audio track into one synchronized item that may be enjoyed by the user, shared by the user, published by the user, and/or modified by the user.

Figure 10A:
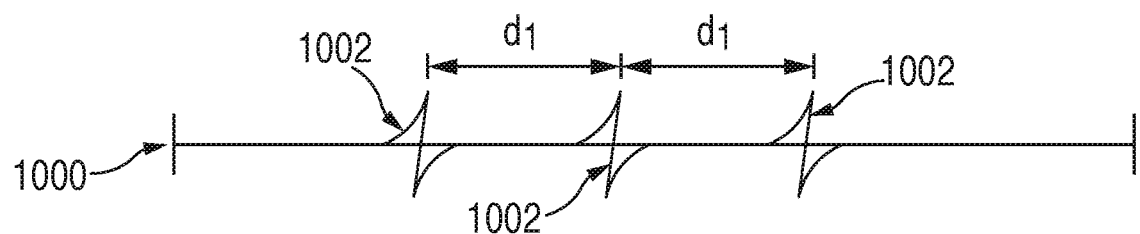
FIGS. 10A-D are illustrative diagrams of various vocal and melodic indicators and phrases for use as transition points between video takes for a music video synchronized to an audio track in accordance with various embodiments.

FIGS. 10A-D are illustrative diagrams of various vocal and melodic indicators and phrases for use as transition points between video takes for a music video synchronized to an audio track in accordance with various embodiments. FIG. 10A includes waveform 1000. In some embodiments, waveform 1000 includes wave 1002, which may repeat after a time d1. For example, wave 1002 may correspond to a bass, or bass beat, which is played within an audio track every measure of the audio track, for instance the first quarter note of each measure. Thus, time d1 corresponds to an amount of time between the first quarter note of each measure of waveform 1000 for a selected audio track.

In some embodiments, each time wave 1002 occurs, a transition between a portion of a video take and another portion of another video take may occur. For example, if wave 1002 corresponds to a bass drum that repeats after a time d1, at each instance of wave 1002 a different portion of a video take may be used for a music video. Thus, various portions of various video takes capture by the user may be paired with an audio track based on one or more occurrences of a particular sound, such as wave 1002.

Figure 10B:
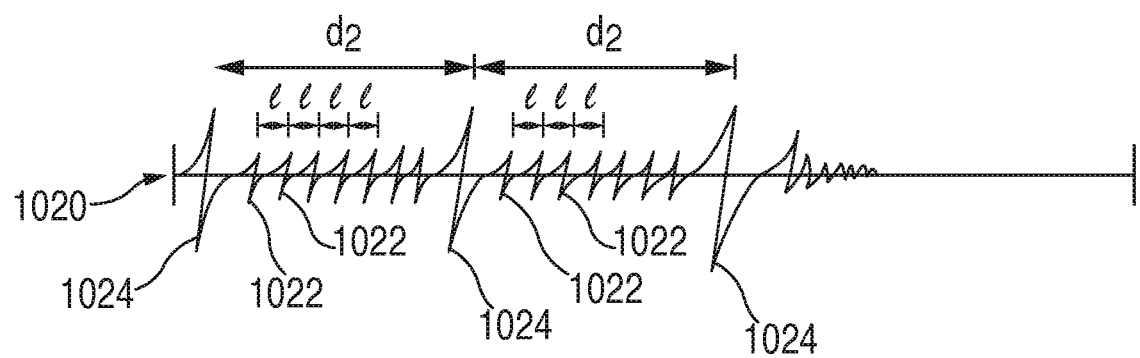

FIG. 10B includes waveform 1020. Waveform 1020 may, in some embodiments, include waves 1022 and 1024. Wave 1022 may repeat after a time 1, while wave 1024 may repeat after a time d2. Each of waves 1022 and 1024 may correspond to different sounds of audio levels. For example, waves 1022 may correspond to a soft, frequently repeating sound, such as a tambourine or maraca. Wave 1024, on the other hand, may correspond to a louder sound, such as a cymbal crash or a guitar strum, that repeats after a certain number of tambourine or maraca, for example, sounds.

In some embodiments, a phrase may include both waves 1022 and 1024. For example, a repeating instrumental phrase may include wave 1022 repeating a first number of times, followed by wave 1024. The instrumental phrase may be of duration d2, which itself includes waves 1022 repeating after time 1.

Similar to how various portions of various video takes may be paired to wave 1002 of waveform 1000, portions of video takes may be paired to portions of waveform 1020 based on occurrences of wave 1022 and/or 1024. For example, in response to wave 1024 occurring, a portion of a video take having a high or large video intensity, or multiple faces recognized therein, may be cut to for a music video. As another example, in response to wave form 1022 occurring, a portion of a video take having a low or small video intensity, or few faces recognized therein, may be cut to. In some embodiments, cutting to various portions of video takes may only occur in response to waves exceeding a certain threshold. For example, an occurrence of wave 1024 may trigger a cut to a portion of a video take, whereas when wave 1022 occurs, no change or cut in the video take being presented may occur.

Figure 10C:
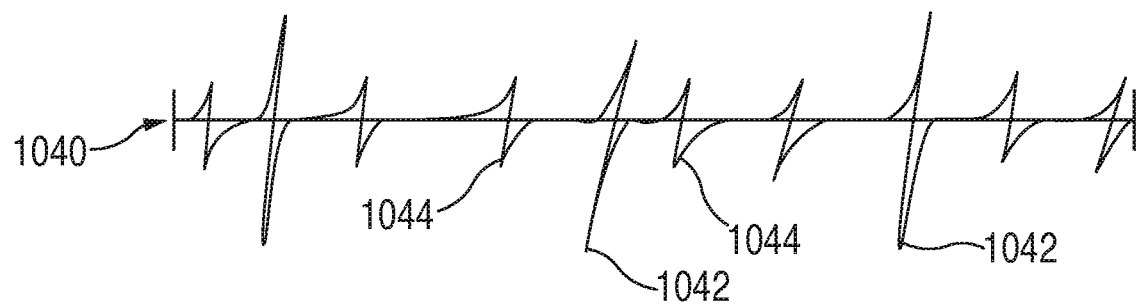

FIG. 10C includes waveform 1040. Waveform 1040, in some embodiments, includes waves 1042 and 1044. Wave 1042, in one embodiment, is a wave having a large peak and a short tail, while wave 1044 is a wave have a smaller peak and a longer tail with respect to wave 1042. These two waves may, for example, correspond to certain types of sounds within waveform 1040, such as a crash cymbal or a bass drum. A crash cymbal, for example, is a percussion instrument having a very high intensity sound when struck (e.g., greater than 100 dB), which decreases in intensity fairly quickly after the initial strike. A bass drum, on the other hand, may have a lower intensity (e.g., less than 80 dB) when struck than a crash cymbal, however the intensity of the sound may decrease less quickly than that of the crash cymbal. Persons of ordinary skill in the art will recognize that the use of a crash cymbal and a bass drum are merely exemplary, and any suitable sound or instrument may be used to describe waves 1042 and 1044, and the aforementioned merely are one illustrative scenario of two instruments with suitable waveforms (e.g., high peak—small tail, short peak—long tail).

In some embodiments, different portions of different or similar video takes may be paired to a particular wave or sound based on that particular wave or sound's intensity and/or tail. For example, different video takes may be cut to in response to each occurrence of a crash cymbal. Thus, each time wave 1042 occurs, the music video may cut to a different video take (e.g., Take 1, Take 2, etc.). As another example, each time a bass drum occurs, a different portion of a same video take cut to previously due to the occurrence of a crash cymbal, may be cut to. Thus, in response to wave 1042 occurring, a music video may cut from Take 2 to Take 3, and then in response to wave 1044 occurring after wave 1042, a different portion of Take 3 (e.g., times 00:50-01:20) may be cut to. In this way, a music video, such as music video 700 of FIG. 7A, may be created based on the various types of waves or sounds within a particular audio track used to synchronize with the music video.

Figure 10D:
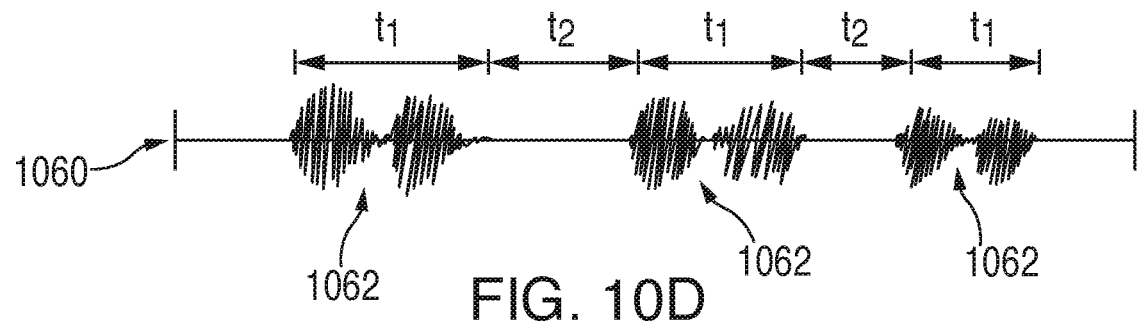

FIG. 10D includes waveform 1060. Waveform 1060 includes, in one embodiment, wave packet 1062. Wave packet 1062 may correspond to a repeating wave of audio that has a duration of time t1 and repeats after a time t2. As an illustrative example, wave packet 1062 may correspond to a vocal phrase of length t1 (e.g., the duration of time of the vocal phrase is length t1), where the vocal phrase repeats periodically during waveform 1060. The period of the vocal phrase repeating is, for example, time t2.

In some embodiments, cuts or transitions to various portions of various video takes may occur in response to wave packet 1062 occurring during an audio track. For example, in response to wave packet 1062 being detecting within the audio track, or waveform 1060, a transition from a certain portion of Take 1 to another portion of Take 2 may occur. As an illustrative example, in response to wave packet 1062 occurring, the created music video may have scene 720, including Take 1 at times 00:15-00:35, switch to scene 730, including Take 3 at times 00:40-0050. In this way, video takes may be paired with an audio track based on one or more instances of a repeating vocal phrase or a standalone vocal phrase.

Figure 10E:
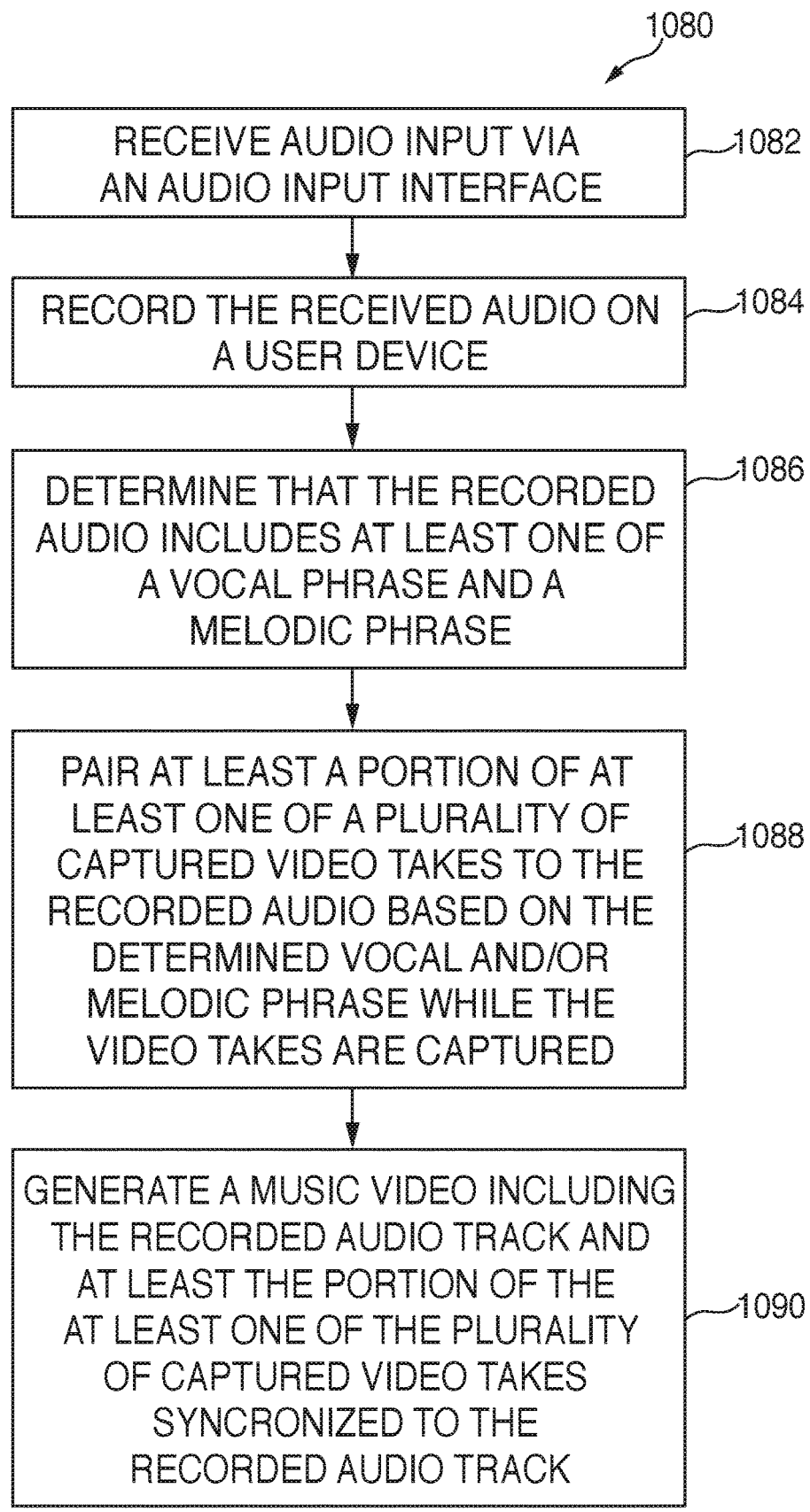
FIG. 10E is an illustrative flowchart of a process for creating a music video including various video takes synchronized to a recorded audio track based on a determined vocal and/or melodic phrase within the audio track in accordance with various embodiments.

FIG. 10E is an illustrative flowchart of a process for generating a music video including various video takes paired to a recorded audio track based on a determined vocal and/or melodic phrase within the audio track in accordance with various embodiments. Process 1080 begins at step 1082. At step 1082, an audio input is received via an audio input interface. For example, a user may receive an input from an external device, such as an electric guitar or keyboard, plugged into their user device via an external device input (e.g., external device input 116). In some embodiments, the audio input may be received via one or more microphones resident on the user device. For example, a user may record themselves singing or playing an acoustic guitar via microphone(s) 114 located on user device 100.

At step 1084, the received audio input may be recorded on the user device. For example, user device 100 of FIG. 1 may include memory 104 and/or storage 106, which may store any audio recorded by user device 100 (e.g., via microphone(s) 114 and/or external audio input 116). In some embodiments, one or more audio recording modules or programs may run on the user device which, in response to a user input, may begin the recording process allowing the user device to record. In some embodiments, a user may record one or more audio inputs onto an external medium, such as a mixing board or personal recorder, and may load the recorded audio to the user device. Persons of ordinary skill in the art will also recognize that steps 1082 and 1084 may be performed at a substantially same time. In some embodiments, however, no audio may be recorded and an audio track may be selected to be used, similar to step 802 of FIG. 8A.

At step 1086, a determination may be made by one or more processors on the user device that the recorded audio includes a vocal phrase and/or a melodic phrase. For example, an audio analysis module or program resident on the user device may analyze the recorded audio and may detect one or more vocal phrases or one or more melodic phrases within the recorded audio. Vocal phrases, for instance, may correspond to catchphrases, lyrics, exclamations, or any other vocal characteristic that may be recognized by the audio analysis module which, when played, allow a user to recognize the particular audio track being played. Melodic phrases, for instance, may correspond to a riff, catchphrase, melody, and/or hook, which when played, allow a user to recognize the particular audio track being played. Vocal phrases and melodic phrase differ merely in that melodic phrases, as used herein, may not include spoken words while vocal phrases do, however this is merely exemplary.

At step 1088, at least a portion of at least one of multiple captured video takes may be paired to the recorded audio based on the determined vocal phrase and/or melodic phrase. For example, as seen above with respect to step 988 of FIG. 9E, based on the video intensity of a particular portion of a video take, a section of audio may be paired with that video take. In one illustrative example, a portion of a video take including a large number of faces recognized therein (e.g., Take 2 of FIG. 9B) may be paired with a recognized vocal or melodic phrase corresponding to a chorus of a particular audio track. The vocal or melodic phrase may be recognized by the audio analysis module as being a chorus section of the audio track, and as such, may be synchronized to a portion of one of the video takes including a high video intensity value. As another illustrative example, a section of the recorded audio corresponding to a verse section may be synchronized with a portion of a video take including few faces recognized therein (e.g., Take 1 of FIG. 9A). Similarly, a section of the audio determined to be an instrumental section only may be synchronized with a portion of a video take including one or no faces determined to be therein (e.g., Take 3 of FIG. 9C).

The plurality of video takes may, in some embodiments, be captured prior to the pairing occurring. For example, video takes may be captured prior to, in parallel to, or after the determination of whether the vocal or melodic phrase is within the recorded audio. In some embodiments, process 1080 may include an additional step which may be substantially similar to step 806 of FIG. 8A, and the previous description may apply.

At step 1090, a music video may be generated. The generated music video, in some embodiments, may include the recorded audio track and at least the portion of the at least one of the plurality of captured video takes synchronized to the recorded audio track. Thus, a music video synchronized with various sections of the recorded audio may be created that is both professional in appearance and quality.

Figure 11:
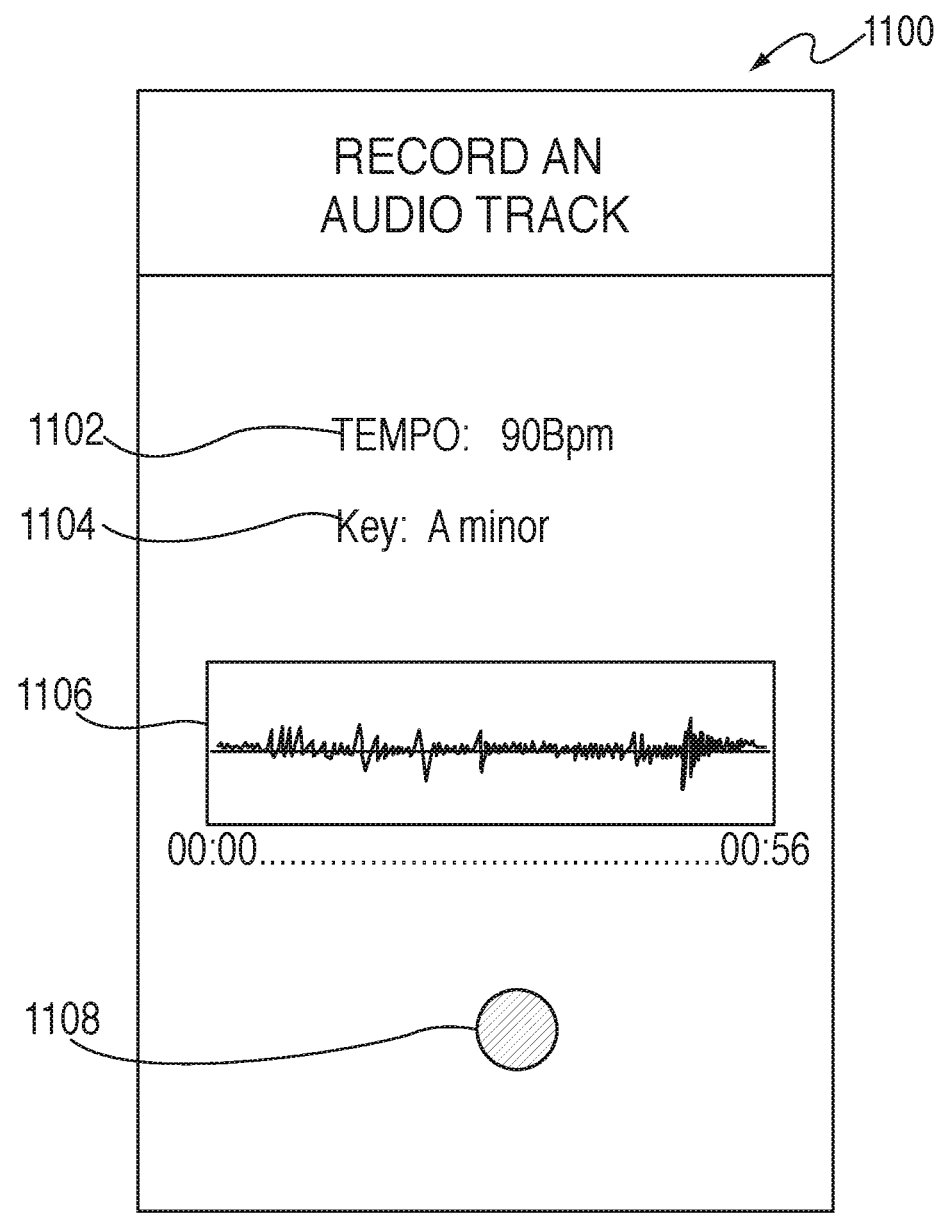
FIG. 11 is an illustrative diagram of a user interface for recording an audio track to be used for creating a music video in accordance with various embodiments.

FIG. 11 is an illustrative diagram of a user interface for recording an audio track to be used for creating a music video in accordance with various embodiments. User interface 1100 may include tempo indicator 1102, musical key indicator 1104, recording waveform 1106, and record button 1108. Other options may be displayed within user interface 1100, such as an edit button, a pause or stop recording button, a musical portion (e.g., verse, chorus) button, a time signature indicator, and/or a musical instrument selection button. However, for simplicity and clarity, only tempo indicator 1102, musical key indicator 1104, recording waveform 1106, and record button 1108 are shown within user interface 1100.

Tempo indicator 1102 may, in some embodiments, show and/or set a tempo for the audio track that will be recorded. Tempo indicator 1102 may include a metronome that plays an audible sound (e.g., a click, beep, or cowbell) or visual indicator (e.g., a flashing light, blinking light, etc.) at a certain rate to indicate to the user making the audio recording a tempo for that recording. For example, the user may set tempo indicator 1102 to be sixty (60) beats per minute ("Bpm"), which means that sixty audio tones will be evenly outputted over the course of a minute (e.g., one beat every second). In some embodiments, one or more processors 102 on user device 102 may be capable of determining a tempo of the recorded audio track based on the audio recording. For example, after a user has recorded an audio track on their user device, the user device may analyze a waveform (e.g., waveform 360 of FIG. 3B) of the recorded audio track to determine a tempo of the audio track based on the audio intensity levels of the waveform.

Musical key indicator 1104, in some embodiments, may be set by the user prior to recording an audio track. For example, the user may set musical key indicator 1104 to be in the key of A-minor. If any of the notes or vocals of the audio recorded by the user device do not match up with the desired musical key, the user device may notify the user. In some embodiments, the user may be prompted to re-record one or more sections of the audio track to fix any tonal issues, or the user may choose to leave the off key sections. In one embodiment, the user may be able to instruct their user device to perform an auto-tune function on the recorded audio to force any section of the recorded audio track that is not in-tune to the selected musical key, to be adjusted so that it conforms with the selected musical key.

In some embodiments, recording waveform 1106 may show a waveform of some or all of the audio track being recorded. The user may then be able to see areas of the recorded audio track where the audio intensity is particularly high, low, or consistent, for example. In some embodiments, recording waveform 1106 may also include visual indicators of the tempo of the song based on the selected tempo of tempo indicator 1102. This may allow a user to synchronize their recording with the desired tempo. Synchronizing the audio with a tempo may be extremely useful when creating a music video that is to be synchronized with the audio track because transition points between various portions of video takes will be more clearly defined then if the audio is not in sync with the desired tempo.

Record button 1108 may, in some embodiments, be substantially similar to capture button 602 of FIG. 6A with the exception that the former may correspond to capturing audio only. However, in some embodiments, a user may be able to press record button 1108 again after starting the audio recording processes to pause and/or stop the recording. Furthermore, record button 1108 may be pressed another time to start recording the audio track again.

In some embodiments, after a music video has been created, one or more options to share the music video may be presented to the user. For example, an option to upload the created music video to a website, or a linked may be provided a website where the music video may be viewed. In some embodiments, an option to share the music video via one or more of email, SMS or text message, instant message, or on one or more social media networks may be provided. In some embodiments, an option to save the music video to the user devices memory or storage (e.g., memory 104 and storage 106) may be provided.

It should be appreciated that the various embodiments described above can be implemented by software, but can also be implemented in hardware or a combination of hardware and software. The various systems described above can also be embodied as computer readable code on a computer readable medium. The computer readable medium can be any data storage device that can store data, and that can thereafter be read by a computer system. Examples of computer readable mediums include read-only memory, random-access memory, CD-ROMs, DVDs, magnetic tape, and optical data storage devices. The computer readable medium can also be distributed over network-coupled computer systems so that the computer readable code is stored and executed in a distributed fashion.

In other embodiments, systems, methods, and devices for creating composite videos are also provided. In addition to making music videos, the composition of short films are becoming increasingly popular. However, many people do not have the tools and specialized skills needed to compile several different scenes, cut them together, and modify audio files to the extent necessary to create professional-quality short films. The systems and methods disclosed in connection with at least these embodiments allow people to easily create composite videos (e.g., short films) in which multiple video takes are played on an audio track.

Figure 12:
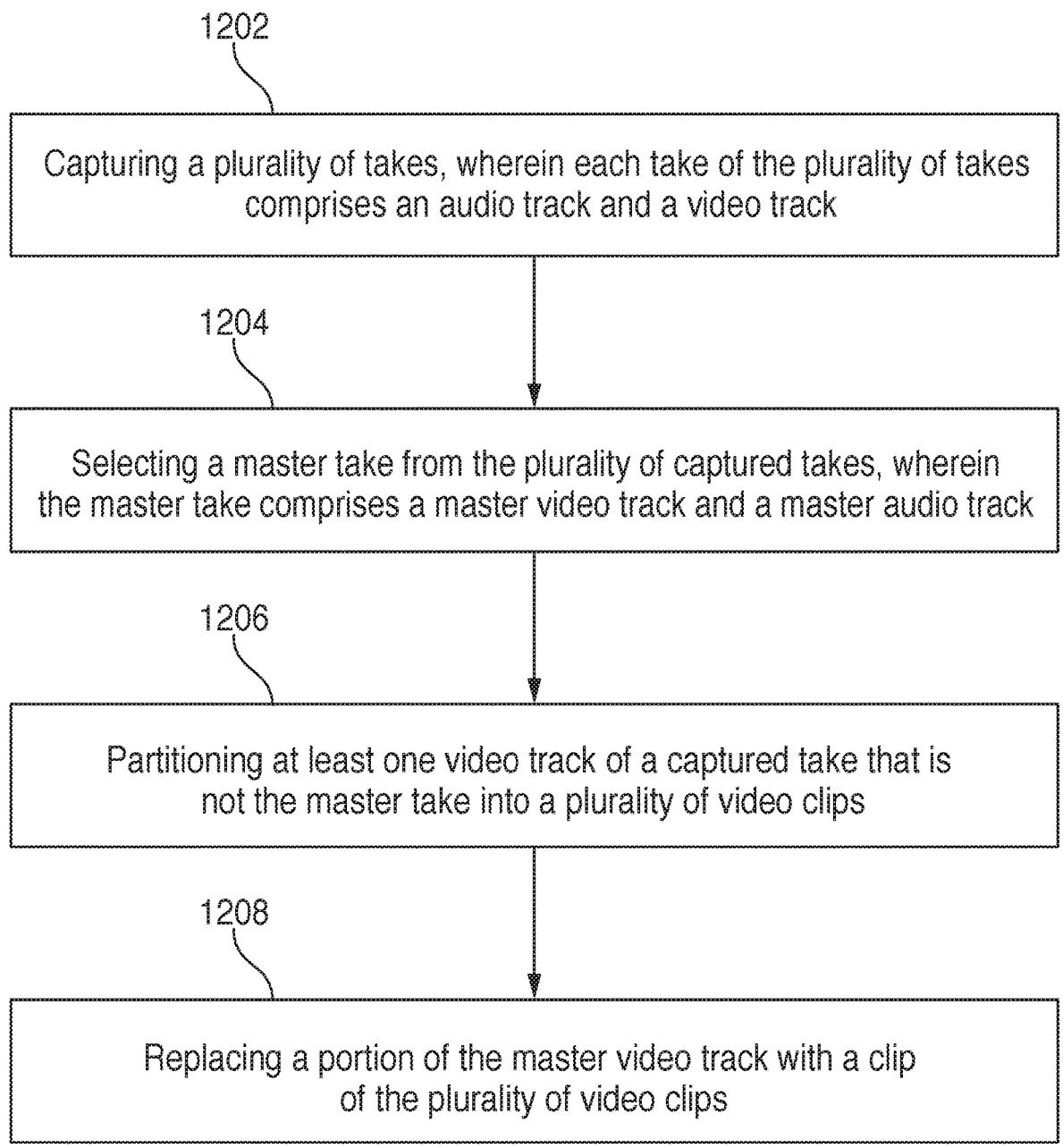
FIG. 12 is an illustrative flow chart of a method for creating a composite video in accordance with various embodiments.

FIG. 12 is an illustrative flow chart of a method for creating a composite video in accordance with various embodiments. Step 1202 involves capturing multiple takes. Each take includes an audio track and a video track. Step 1204 involves selecting a master take from the captured takes, and the master take includes a master video track and a master audio track. Step 1206 involves partitioning at least one video track of a captured take that is not the master take into multiple video clips. Finally, step 1208 involves replacing a portion of the master video track with a clip of the multiple video clips.

In more detail, step 1202 involves capturing multiple takes. In this regard, a take is any recording that may be created using a recording device, such as a camera and/or microphone. A take is captured by making a selection on a user interface to begin a recording session. A take may include both an audio track (i.e., an audio recording, which is recorded by a recording device, such as a microphone) and a video track (i.e., a visual recording, which is recorded by a recording device, such as a camera). Alternatively, a take may include a video track without an audio track. A take may also include an audio track without a video track. The takes themselves may be any duration. For instance, a first take may be ten seconds in duration, a second take may be fifteen seconds in duration, a third take may be seven seconds in duration, a fourth take may be sixty seconds in duration, and so on.

With respect to step 1204, in further detail, a master take is selected from the captured takes. The master take includes a master track, which is the audio track to which all of the video tracks may be played, and a master video track, which is the original video track that was captured when the master take was originally recorded. Essentially, the master take creates the "scene" of the entire video, and the other takes take part within the "scene." As such, the video aspect of the final composite video may include portions of video tracks from the captured takes combined with the master audio track. In an alternative embodiment, however, the master audio track may be combined with other audio tracks to create a custom track, may be looped multiple times, may be modified so that it is distorted, slowed down, sped up, or any other modification that may be desirable to a user. In another embodiment, if a user is not satisfied with the composite video, the user may deselect the selected master take and select a new take of the captured takes as the new master take.

With further detail to step 1206, at least one video track of a captured take that is not the master take is partitioned into multiple video clips. In an alternative embodiment, however, any video track may be partitioned, including the master take, into any number of video clips. Every video clip is capable of being added, compiled, or otherwise used to generate a composite video that includes multiple video clips.

In some embodiments relating to step 1206, each take may be partitioned into video clips based on a variety of factors. For instance, the audio track of a take may be analyzed to determine notable events. The term "notable event" is used to signify any occurrence within a take, and can be audio, visual, or both. For instance, if an audio intensity in the audio track exceeds a predefined threshold, this may indicate that a notable event has occurred (e.g., a crash, a scream from a person being recorded, the appearance of an additional person in the video display, etc.), triggering the creation of a video clip within the take. As another example, the video track of a take may be analyzed to determine notable events (e.g., determine a change in luminosity in the video, a drastic change in prevalence, arrangement, or other appearance of pixels from one frame to another, etc.).

In some other embodiments relating to step 1206, it may be desirable to play the visual element of the notable event in its entirety, rather than at the exact moment that the audio intensity changes. Thus, where the audio intensity changes at time (t) on a timeline associated with the progression of the audio and/or video track, the video clip signifying the notable event may begin five seconds prior to the occurrence of the notable event (e.g., t minus five seconds in the timeline). The notable event may then be placed into the master take. In an embodiment, the notable event may be matched with a notable event of the audio track of the master take (e.g., a loud sound, an audio effect, a decrease in audio intensity for a predetermined duration, etc.) for greater impact in the final composite video. The resulting composite video may thus include the master take, and might cut to the notable event at a certain moment within the composite video.

In another embodiment relating to step 1206, a user may independently determine notable events and define the length and period of time within a take to create a video clip of the take to be placed into the master take to create the final composite video. For instance, in an embodiment, a user determines that a notable event has happened in the fifth second of a take, and lasts until the eleventh second of the take. The user thus defines a video clip of the take as beginning at the fifth second of the take and ending at the eleventh second of the take, for a total duration of six seconds. The user may then determine that the video clip should be played at the tenth second of the master take, so that the resulting video cuts to the video clip at that time within the video. In another embodiment, a user may search through frames within a video track and select a frame at which a video clip begins, as well as select a frame at which the video clip ends.

In another embodiment of step 1206, a user may decide to modify various video clips of a take. For instance, a user might decide to modify the color scheme (e.g., by adding a filter), extend the duration of the take and reduce the frame rate for a slow motion effect, or reduce the duration of the take and increase the frame rate for a fast motion effect. The user may modify a video clip of a take using any effect known in the art, and using any method known in the art. In another embodiment, a user may choose to add short videos to a video clip, add sounds to the master audio track that coincide with an occurrence within the video clip, distort the video clip, or play the video clip in reverse by playing each frame sequentially from the last recorded frame to the first recorded frame, in addition to other editing techniques known in the art.

In another embodiment, a user may decide to play the corresponding audio track associated with the video track of a video clip while simultaneously continuing to play the master audio track in the finished video. For instance, a user may decide that the master audio track provides excellent narration, but wants to provide the audio associated with the video content in each video clip. In such an embodiment, an option may be provided to partition one or more takes into audiovisual clips that include both an audio track and a video track. A user may then select the desirable audiovisual clips to include in the final composite video.

Finally, at step 1208, a portion of the master video track is replaced with at least one video clip. As a result of this step, a composite video that includes the master audio track and a composite video track is generated. The resulting composite video, in some embodiments, may include the recorded audio track of the master take and at least a video clip of a video track overlayed onto the audio track of the master take. Thus, a composite video with various clips from the recorded takes may be created that is both professional in appearance and quality.

In another embodiment relating to step 1208, a visual medium that is not taken from the takes may be selected and used in the composite video. For instance, a user may decide to add animations, presentations, pictures, or other visual media into the composite video. In an embodiment, the user selects the visual medium to include into the composite video. In some embodiments, the user may decide what temporal interval within the composite video at which the visual medium may be included in the composite video. At that temporal interval, a portion of the master video corresponding to that temporal interval may be replaced with the visual medium.

In an embodiment of step 1208, or an embodiment which may occur after step 1208, after reviewing the composite video, a user may determine that it would be desirable to play the audio associated with a particular video clip. As such, the user may select the particular video clip and enter an input that causes the portion of the audio track associated with the video track at that particular video clip to be played concurrently with the particular video clip and the master audio track. This creates essentially an audiovisual clip taken from a take, which is played on the master audio track. In some embodiments, the volume of the audio from the audiovisual clip is higher than the volume of master audio track. In some embodiments, the volume of the audio from the audiovisual clip is lower than the volume of the master audio track. In some embodiments, the volumes of the audio from the audiovisual clip and the master audio track are the same.

Figure 13A:
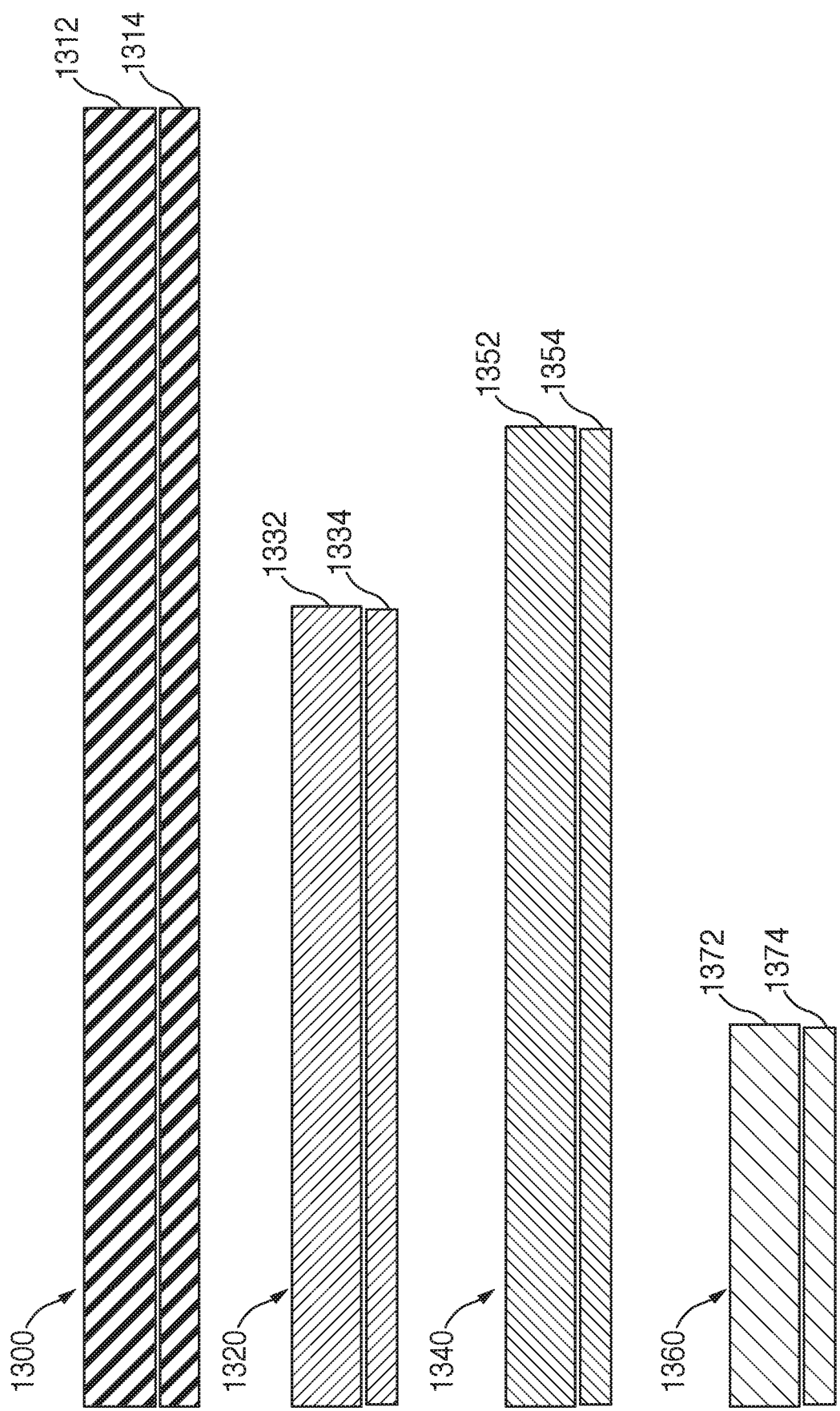
FIG. 13A is an illustrative diagram representing multiple captured takes in accordance with various embodiments.

FIG. 13A is an illustrative diagram representing multiple captured takes in accordance with various embodiments of the invention. Each take may include multiple video clips, hereinafter referred to as clips. The captured takes include take 1 1300, take 2 1320, take 3 1340, and take 4 1360. Take 1 1300 includes video track 1 1312 and audio track 1 1314, take 2 1320 includes video track 2 1332 and audio track 2 1334, take 3 1340 includes video track 3 1352 and audio track 3 1354, and take 4 1360 includes video track 4 1372 and audio track 4 1374.

Figure 13B:
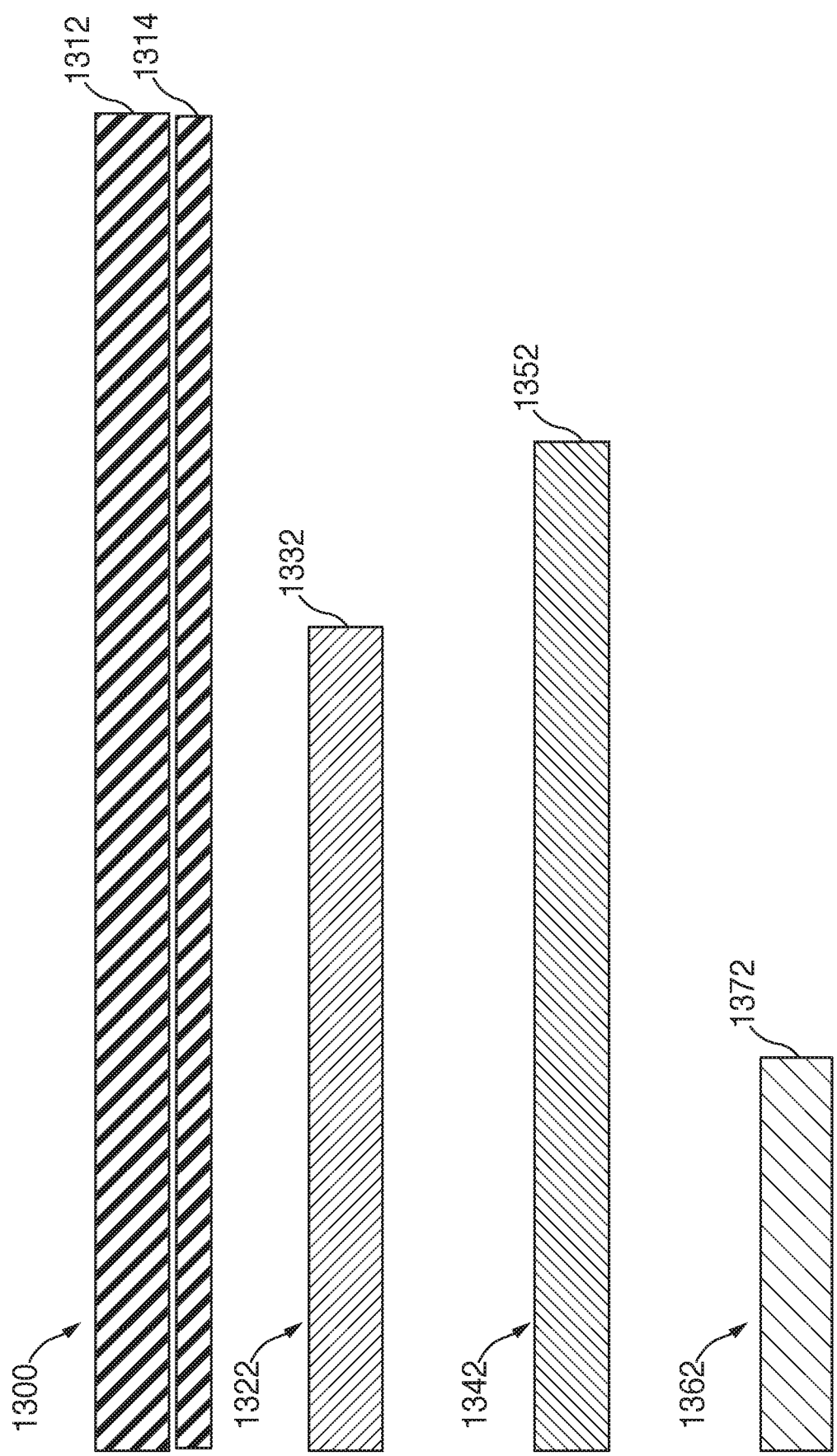
FIG. 13B is an illustrative diagram representing multiple captured takes in accordance with various embodiments.

FIG. 13B is an illustrative diagram representing multiple captured takes in accordance with various embodiments. In the embodiment of FIG. 13B, take 1 1300 is selected as the master take, and the audio tracks from take 2 1320, take 3 1340, and take 4 1360 in FIG. 13A have been removed, resulting in take 2 1322 (which now includes video track 1332 and no audio track), take 3 1342 (which now includes video track 1352 and no audio track), and take 4 1362 (which now includes video track 1372 and no audio track).

In an embodiment, the removal of the audio tracks from take 2 1320, take 3 1340, and take 4 1360 is effected in response to the selection of take 1 1300 as the master take.

Figure 13C:
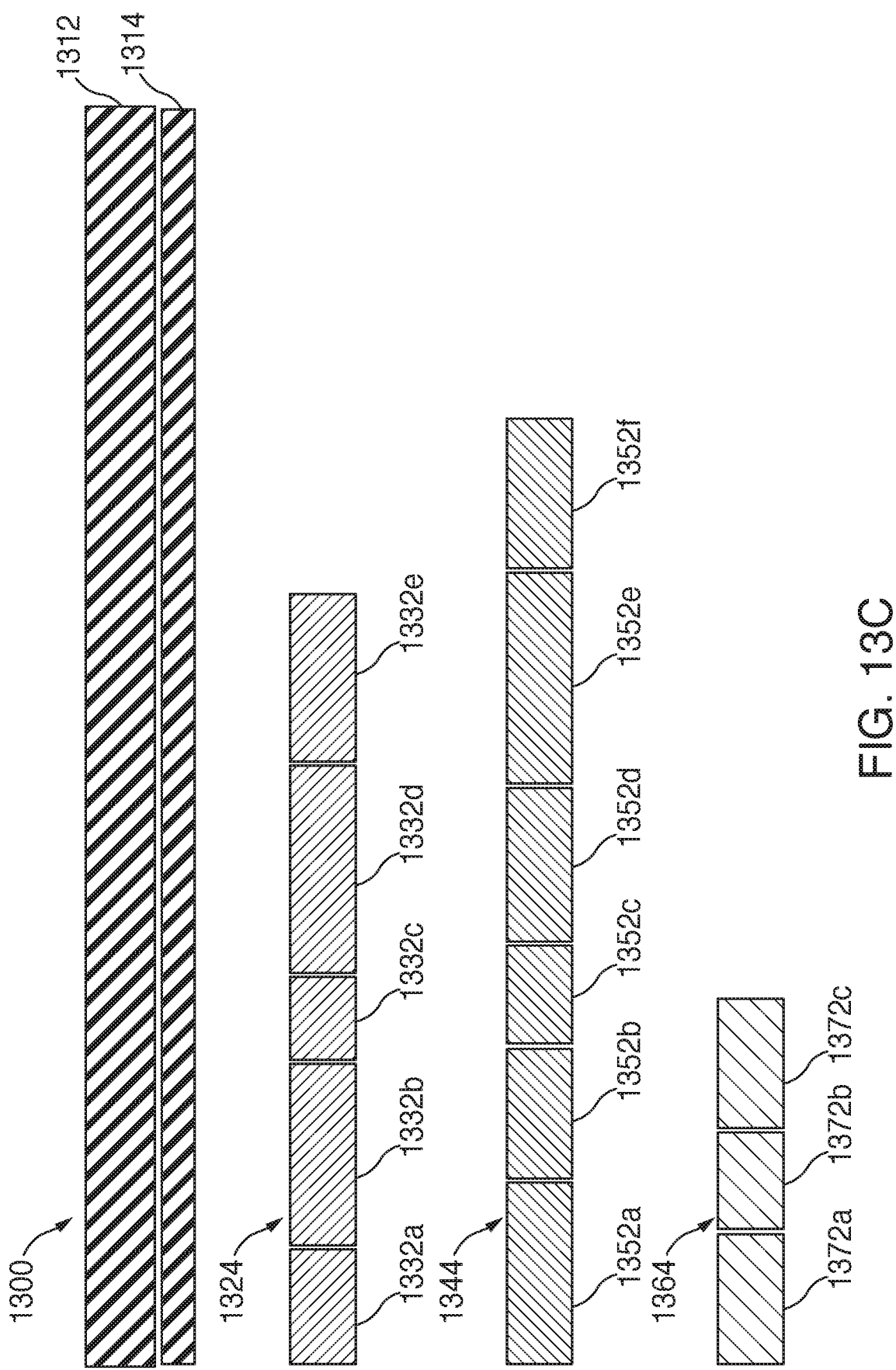
FIG. 13C is an illustrative diagram representing multiple captured takes in accordance with various embodiments.

FIG. 13C is an illustrative diagram representing multiple captured takes in accordance with various embodiments. FIG. 13C includes take 1 1300, take 2 1324, take 3 1344, and take 4 1364. In an embodiment, video tracks of take 2 1324, take 3 1344, and take 4 1364 are partitioned into various video clips. The video track of take 2 1324 is partitioned into video clip 1 1332*a*, video clip 2 1332*b*, video clip 3 1332*c*, video clip 4 1332*d*, and video clip 5 1332*e*. The video track of take 3 1344 is partitioned into video clip 6 1352*a*, video clip 7 1352*b*, video clip 8 1352*c*, video clip 9 1352*d*, video clip 10 1352*e*, and video clip 11 1352*f*. The video track of take 4 1364 is partitioned into video clip 12 1372*a*, video clip 13 1372*b*, and video clip 14 1372*c*.

In an embodiment, each video clip (i.e., partition, video clip of a video take, etc.) is created automatically in accordance with a preselected set of instructions. For example, as stated above, the video clips may be based on notable events, and the notable events may be determined in various ways (e.g., by detecting an audio intensity that exceeds a predefined threshold, by detecting a change in video luminosity that exceeds a predefined threshold, by detecting a substantial change in the content of the video that exceeds a predefined threshold, a change in video or audio quality, etc.). In another embodiment, the video clips may be partitioned manually by a user. For instance, a user may select specific points in the video track of take 2 1324 to partition the video track of take 2 1324 into a series of video clips based on that user's own preferences and decision making. In another embodiment, after video clips are partitioned automatically, the user may choose to adjust the length and location of each video clip. In yet another embodiment, a user may choose to add, delete, and/or modify features and characteristics of each video clip as well. For instance, a user may choose to apply a filter to a video clip. In another embodiment, a user may choose that a video clip be presented in slow motion, fast motion, or at a loop. For instance, a two second video clip may be played in slow motion, extending its duration to five seconds total. In another embodiment, a five second video clip may be played in fast motion, reducing its duration to two and a half seconds total. In yet another embodiment, a six second video clip may be presented in fast motion at three times its speed as originally recorded, and looped three times so that the overall duration of the video clip remains at six seconds.

Figure 13D:
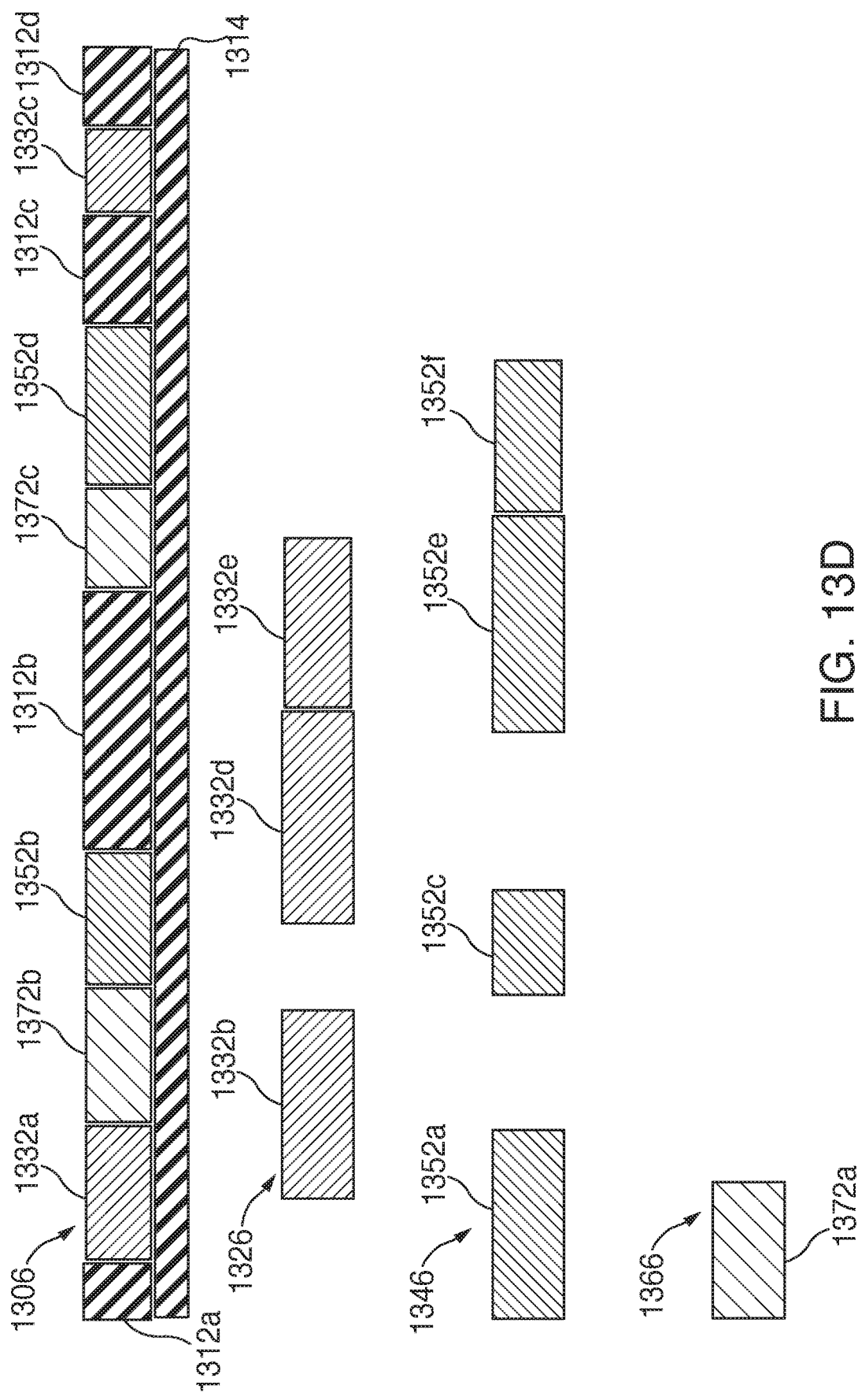
FIG. 13D is an illustrative diagram representing multiple captured takes in accordance with various embodiments.

FIG. 13D is an illustrative diagram representing multiple captured takes in accordance with various embodiments. FIG. 13D includes composite video 1306, the video track of take 2 1326 (which is substantially the same as the video track of take 2 1324 in FIG. 13C), the video track of take 3 1346 (which is substantially the same as the video track of take 3 1344 in FIG. 13C), and the video track of take 4 1366 (which is substantially the same as the video track of take 4 1364 in FIG. 13C). In FIG. 13D, the clips from the video tracks of take 2 1326, take 3 1346, and take 4 1366 are interspersed into the video track of take 1 1306 (which is substantially the same as take 1 1300), which also includes video clip 15 1312*a*, video clip 16 1312*b*, video clip 17 1312*c*, and video clip 18 1312*d* from video track 1 1312 in FIG. 13A, to create a composite video 1306 that includes audio track 1 1314 and video clips from track 1 1306, track 2 1326, track 3 1346, and track 4 1366. Further editing may be performed to composite video 1306. In another embodiment, any video clips may be copied in any form (i.e., in the video clip's unedited form, or in the form that the video clip is in after features are added, deleted, and/or modified). This allows each video clip to be played multiple times at different points within composite video 1306.

In an embodiment, composite video 1306 may be further modified. For instance, a preview of composite video 1306 may be provided prior to finalizing composite video 1306. If the preview is unsatisfactory, a user may decide to modify composite video 1306. For instance, in an embodiment, a user may wish to make video clip 7 1352*b* longer than originally displayed in the preview. Accordingly, a user may select to extend the duration of video clip 7 1352*b* by setting its beginning to occur at an earlier moment within composite video 1306 or setting its ending to begin at a later moment within composite video 1306. As a result of this change, the duration of related video clips may change so that they all remain in sequential harmony, or may be left unchanged entirely (e.g., when video clip 7 1352*b* is shortened or lengthened in duration, video clip 6 1352*a*, video clip 8 1352*c*, video clip 13 1372*b*, and video clip 16 1312*b* may change accordingly). As another example, video clip 7 1352*a* may be replaced with clip 6 1352*a*, resulting in ending clip 13 1372*b* at an earlier moment in composite video 1354, beginning clip 15 1312*b* at a later moment in composite video 1354, or overwriting video clip 15 1312*b* from the moment it was originally supposed to be played until clip 6 1352*a* is finished playing.

The above described embodiments of the invention are presented for purposes of illustration and not of limitation.

What is claimed is:

1. A method for creating a composite video, the method comprising:
   capturing, using a user device, a plurality of takes, wherein each take of the plurality of takes comprises an audio track and a video track;
   selecting, in response to capturing the plurality of takes, and using an interface of the user device, a master take from the plurality of takes that were captured by the user device, wherein the master take is at least one of a first take and a second take of the plurality of captured takes, and wherein the master take comprises a master video track and a master audio track;
   determining, in response to capturing the plurality of takes, a notable event occurring within a third take of the plurality of takes;
   partitioning, automatically in response to selecting the master take, at least one of a first video track and a second video track of the third take into a plurality of video clips;
   creating, in response to determining the notable event, a first video clip of the plurality of video clips, wherein the first video clip begins at a period prior to an occurrence of the notable event;
   automatically selecting portions of the master take to replace with the first video clip of the plurality of video clips; and
   replacing, automatically in response to selecting the master take, a portion of the master video track with the first video clip of the plurality of video clips.

2. The method of claim 1, further comprising modifying the first video clip.

3. The method of claim 2, wherein modifying comprises at least one of:
   changing a color scheme of the first video clip;
   increasing a frame rate of the first video clip; and
   decreasing a frame rate of the first video clip.

4. The method of claim 1, wherein determining comprises detecting an audio intensity within the master audio track and determining that the audio intensity exceeds a predefined threshold.

5. The method of claim 1, further comprising:
   selecting a visual medium that is not a take of the plurality of takes and is not a video clip of the plurality of video clips; and
   replacing a portion of the master video track with the visual medium.

6. The method of claim 1, further comprising:
   partitioning the master video track into video clips.

7. The method of claim 6, further comprising modifying a first video clip partitioned from the master video track.

8. The method of claim 7, wherein modifying comprises at least one of:
   changing a color scheme of the first video clip;
   increasing a frame rate of the first video clip; and
   decreasing a frame rate of the first video clip.

9. The method of claim 1, further comprising generating a preview composite video, wherein the preview composite video comprises options to modify the preview composite video.

10. The non-transitory computer readable medium of claim 1, further containing instructions that, when executed by the at least one processor, cause the computing device to generate a preview composite video, wherein the preview composite video comprises options to modify the preview composite video.

11. A non-transitory computer readable medium containing instructions that, when executed by at least one processor of a computing device, cause a computing device to:
   capture a plurality of takes, wherein each take of the plurality of takes comprises an audio track and a video track;
   select, in response to capturing the plurality of takes, a master take from the plurality of takes that were captured by the user device, wherein the master take is at least one of a first take and a second take of the plurality of captured takes, and wherein the master take comprises a master video track and a master audio track;
   determine, in response to capturing the plurality of takes, a notable event occurring within a third take of the plurality of takes;
   partition, automatically in response to selecting the master take, at least one of a first video track and a second video track of the third take of the plurality of takes into a plurality of video clips;
   create, in response to determining the notable event, a first video clip of the plurality of video clips, wherein the first video clip begins at a period prior to an occurrence of the notable event;
   automatically select portions of the master take to replace with the first video clip of the plurality of video clips; and
   replace, automatically in response to selecting the master take, a portion of the master video track with the first video clip of the plurality of video clips.

12. The non-transitory computer readable medium of claim 11, further containing instructions that, when executed by the at least one processor, cause the computing device to modify the first video clip.

13. The non-transitory computer readable medium of claim 12, wherein modifying the first video clip comprises at least one of:
   changing a color scheme of the first video clip;

increasing a frame rate of the first video clip; and
decreasing a frame rate of the first video clip.

14. The non-transitory computer readable medium of claim 11, wherein determining the notable event comprises detecting an audio intensity within the master audio track and determining that the audio intensity exceeds a predefined threshold.

15. The non-transitory computer readable medium of claim 11, further containing instructions that, when executed by the at least one processor, cause the computing device to:
   select a visual medium that is not a take of the plurality of takes and is not a video clip of the plurality of video clips; and
   replace a portion of the master video track with the visual medium.

16. The non-transitory computer readable medium of claim 11, further containing instructions that, when executed by the at least one processor, cause the computing device to partition the master video track into video clips.

17. The non-transitory computer readable medium of claim 16, further containing instructions that, when executed by the at least one processor, cause the computing device to modify a first video clip partitioned from the master video track.

18. The non-transitory computer medium of claim 17, wherein modifying the first video clip comprises at least one of:
   changing a color scheme of the first video clip;
   increasing a frame rate of the first video clip; and
   decreasing a frame rate of the first video clip.

* * * * *